(12) United States Patent
Kometani

(10) Patent No.: US 9,272,727 B2
(45) Date of Patent: Mar. 1, 2016

(54) STEERING SYSTEM

(71) Applicant: JTEKT CORPORATION, Osaka-shi, Osaka (JP)

(72) Inventor: Hideo Kometani, Nara (JP)

(73) Assignee: JTEKT CORPORATION, Osaka (JP)

(*) Notice: Subject to any disclaimer, the term of this patent is extended or adjusted under 35 U.S.C. 154(b) by 196 days.

(21) Appl. No.: 14/061,032

(22) Filed: Oct. 23, 2013

(65) Prior Publication Data

US 2014/0109702 A1   Apr. 24, 2014

(30) Foreign Application Priority Data

Oct. 24, 2012 (JP) ................................. 2012-235045
Oct. 24, 2012 (JP) ................................. 2012-235046

(51) Int. Cl.
*B62D 3/12* (2006.01)
*B62D 5/04* (2006.01)
*B62D 5/22* (2006.01)

(52) U.S. Cl.
CPC .............. *B62D 3/123* (2013.01); *B62D 5/0421* (2013.01); *B62D 3/12* (2013.01); *B62D 5/0442* (2013.01); *B62D 5/22* (2013.01); *Y10T 74/18096* (2015.01)

(58) Field of Classification Search
CPC ........... B62D 3/12; B62D 5/22; B62D 5/0442
USPC ........................... 180/428, 432, 443, 444, 446
See application file for complete search history.

(56) References Cited

U.S. PATENT DOCUMENTS

| 4,593,578 A * | 6/1986 | Kobayashi et al. .............. 74/498 |
| 4,681,183 A * | 7/1987 | Oshita ........................... 180/446 |
| 4,939,436 A * | 7/1990 | Morishita et al. .............. 318/434 |
| 6,543,569 B1 | 4/2003 | Shimizu et al. |
| 6,585,074 B2 * | 7/2003 | Katou et al. ................... 180/428 |
| 2002/0063012 A1* | 5/2002 | Katou et al. ................... 180/427 |
| 2003/0221895 A1* | 12/2003 | Palakodati et al. ........... 180/443 |

(Continued)

FOREIGN PATENT DOCUMENTS

| DE | 100 49 570 A1 | 4/2002 |
| DE | 10 2011 002122 A1 | 10/2012 |

(Continued)

OTHER PUBLICATIONS

Apr. 9, 2015 Search Report issued in Euorpean Patent Application No. 14195355.4.
Feb. 13, 2014 Extended European Search Report issued in European Application No. 13 18 9927.

*Primary Examiner* — Joseph Rocca
*Assistant Examiner* — Marc A Scharich
(74) *Attorney, Agent, or Firm* — Oliff PLC

(57) ABSTRACT

A steering system includes a rack shaft that extends in an axial direction so as to pass through a housing and including a first rack and a second rack on an outer circumference of the rack shaft. The first rack and second rack are separated from each other in the axial direction. The first pinion shaft includes a first pinion that has helical teeth and meshes with the first rack, and a second pinion shaft includes a second pinion that has helical teeth and meshes with the second rack. The first pinion shaft and the second pinion shaft are on the same side of the rack shaft. A rack bush is between the pinion shafts in the axial direction of the rack shaft, held by the housing so as to support the rack shaft slidably in the axial direction, and limits a movement of the rack shaft in a direction parallel to both of the pinion shafts.

15 Claims, 17 Drawing Sheets

(56) References Cited

U.S. PATENT DOCUMENTS

| | | | |
|---|---|---|---|
| 2004/0007416 A1* | 1/2004 | Furumi et al. | 180/443 |
| 2005/0072621 A1* | 4/2005 | Hara et al. | 180/444 |
| 2005/0257992 A1* | 11/2005 | Shiino et al. | 180/444 |
| 2006/0054378 A1* | 3/2006 | Tanaka et al. | 180/444 |
| 2006/0076180 A1* | 4/2006 | Saito et al. | 180/428 |
| 2006/0144636 A1 | 7/2006 | Beutler et al. | |
| 2012/0160595 A1* | 6/2012 | Fujitomi et al. | 180/443 |

FOREIGN PATENT DOCUMENTS

| | | |
|---|---|---|
| EP | 2 468 606 A2 | 6/2012 |
| JP | U-64-18977 | 1/1989 |
| JP | 2006-264621 A | 10/2006 |

\* cited by examiner

STEERING SYSTEM

INCORPORATION BY REFERENCE

The disclosure of Japanese Patent Applications No. 2012-235045 and No. 2012-235046 filed on Oct. 24, 2012 each including the specification, drawings and abstract is incorporated herein by reference in its entirety.

BACKGROUND OF THE INVENTION

1. Field of the Invention

The invention relates to a steering system.

2. Description of Related Art

In terms of a rack-and-pinion steering system, there has been proposed a dual-pinion steering system in which a main pinion for transmitting manual steering effort from a steering wheel and an auxiliary pinion for transmitting steering auxiliary force caused by an electric motor are respectively engaged with their corresponding racks of a rack shaft. Usually, a pair of end portions of the rack shaft is supported slidably in its axial direction by a rack bush held by a housing. In Japanese Utility Model Application Publication No. 64-18977, that end portion of the pair of end portions of the rack shaft which is closer to the auxiliary pinion is received by an eccentric bearing bush serving as the rack bush. The eccentric bearing bush changes a position for pivoting the rack shaft according to a rotating position thereof, thereby adjusting an engagement state between the auxiliary pinion and the rack shaft.

In the meantime, as illustrated in a schematic view of FIG. 24, two pinions 91, 92 which include helical teeth fowled substantially in the same direction and of which axial directions are substantially parallel to each other respectively mesh with racks 94, 95 formed on the substantially same side surface of a rack shaft 93. In this case, the rack shaft 93 during steering receives, from both of the pinions 91, 92, component forces of a meshing reaction force in a direction (a direction shown by a void arrow in the figure) substantially parallel to the axial directions of the pinions 91, 92, and performs a translational motion.

SUMMARY OF THE INVENTION

Due to this translational motion, contact ratios of the respective pinions with their corresponding racks decrease, which may result in an increase of meshing sound. Further, a biasing force of the rack bush (the eccentric bearing bush) for supporting that end portion of the rack shaft which is closer to the auxiliary pinion causes a bending moment to act on the rack shaft with a meshing portion between the auxiliary pinion and the rack shaft being as a supporting point, and due to the bending moment, backlash of a meshing portion between the main pinion and the rack shaft increases and meshing between them is weakened, which may cause noise due to meshing sound. In view of this, the invention provides a steering system that is able to restrain an occurrence of noise due to a translational motion of a rack shaft and to restrain an increase of backlash caused due to biasing from a rack bush.

A first aspect of the invention is such that a steering system includes: a housing; a rack shaft extending in an axial direction so as to pass through the housing and including a first rack and a second rack on its outer circumference so that they are separated from each other in the axial direction, the first rack and the second rack having respective helical teeth inclined toward the same side relative to the axial direction; a first pinion shaft including a first pinion that has helical teeth and meshes with the first rack; a second pinion shaft including a second pinion that has helical teeth and meshes with the second rack, the second pinion shaft being placed on the same side as the first pinion shaft relative to a plane including a central axis of the rack shaft and parallel to a central axis of the first pinion shaft; and a rack bush placed between the pinion shafts in the axial direction of the rack shaft, held by the housing so as to support the rack shaft slidably in the axial direction, and limiting a movement of the rack shaft in a direction substantially parallel to both of the pinion shafts.

According to the above aspect, the racks meshing with the respective pinions include respective helical teeth inclined toward the same side relative to the axial direction of the rack shaft, and further, the second pinion shaft is placed on the same side as the first pinion shaft relative to the plane including the central axis of the rack shaft and parallel to the central axis of the first pinion shaft. Accordingly, the rack shaft tends to perform a translational motion in the direction substantially parallel to both of the pinion shafts. In view of this, a rack bush for limiting a movement of the rack shaft in the direction substantially parallel to both of the pinion shafts is placed between the pinion shafts in terms of the axial direction of the rack shaft. This makes it possible to efficiently limit the movement (the translational motion) of the rack shaft in the direction substantially parallel to both of the pinion shafts. This improves contact ratios of the pinions with respect to their corresponding racks of the rack shaft, thereby making it possible to reduce meshing sound.

Further, a second aspect of the invention is such that a steering system includes: a housing; a rack shaft extending in an axial direction so as to pass through the housing and including a first rack and a second rack on its outer circumference so that they are separated from each other in the axial direction, the first rack and the second rack having respective helical teeth inclined toward the same side relative to the axial direction; a first pinion shaft including a first pinion that has helical teeth and meshes with the first rack; a second pinion shaft including a second pinion that has helical teeth and meshes with the second rack, the second pinion shaft being placed on an opposite side to the first pinion shaft relative to a plane including a central axis of the rack shaft and parallel to a central axis of the first pinion shaft; and a rack bush placed between the pinion shafts in the axial direction of the rack shaft, held by the housing so as to support the rack shaft slidably in the axial direction, and limiting a movement of the rack shaft in a direction substantially parallel to both of the pinion shafts.

According to the above aspect, the racks meshing with the respective pinions have respective helical teeth inclined toward the same side relative to the axial direction of the rack shaft, and further, the second pinion shaft is placed on the opposite side to the first pinion shaft relative to the plane including the central axis of the rack shaft and parallel to the central axis of the first pinion shaft. Accordingly, the rack shaft tends to perform a translational motion in the direction substantially parallel to both of the pinion shafts. In view of this, a rack bush for limiting a movement of the rack shaft in the direction substantially parallel to both of the pinion shafts is placed between the pinion shafts in terms of the axial direction of the rack shaft. This makes it possible to efficiently limit the movement (the translational motion) of the rack shaft in the direction substantially parallel to both of the pinion shafts. This improves contact ratios of the pinions with respect to their corresponding racks of the rack shaft, thereby making it possible to reduce meshing sound.

Further, in the above aspect, the rack bush may include, as a biasing portion for biasing the rack shaft, elastic projection portions for biasing the rack shaft in the direction substantially parallel to both of the pinion shafts. Further, in the above aspect, the rack bush may include, as a biasing portion for biasing the rack shaft, only elastic projection portions for biasing the rack shaft in the direction substantially parallel to both of the pinion shafts.

According to the above configuration, the rack bush may include, as a biasing portion for biasing the rack shaft, elastic projection portions for biasing the rack shaft in the direction substantially parallel to both of the pinion shafts. Accordingly, it is possible to effectively restrain the translational motion of the rack shaft, thereby achieving noise reduction. Further, according to the above configuration, the rack bush may include, as a biasing portion for biasing the rack shaft, only elastic projection portions for biasing the rack shaft in the direction substantially parallel to both of the pinion shafts. This accordingly makes it possible to improve steering feeling by restraining excessive meshing force between the respective racks and their corresponding pinions, while restraining the translational motion of the rack shaft so as to achieve noise reduction.

Further, in the above aspect, the rack bush may include, as a biasing portion for biasing the rack shaft, first elastic projection portions for biasing the rack shaft in the direction substantially parallel to both of the pinion shafts, and a second elastic projection portion for biasing the rack shaft toward a side of at least one of the first pinion and the second pinion.

According to the above configuration, the rack bush is able to elastically bias the rack shaft toward the side of at least one of the pinions, thereby making it possible to effectively improve a contact ratio of the at least one of the pinions with respect to its corresponding rack.

Further, in the above aspect, the first pinion shaft may be a shaft for transmission, of steering auxiliary force, and the second pinion shaft may be a shaft for transmission of manual steering effort.

According to the above configuration, it is possible to improve a contact ratio of the first pinion shaft for transmission of steering auxiliary force with respect to the first rack, and to improve a contact ratio of the second pinion shaft for transmission of manual steering effort with respect to the second rack.

Further, in the above configuration, the rack bush may be placed closer to the first pinion shaft than a central position (P1) between the first pinion shaft and the second pinion shaft in the axial direction of the rack shaft.

According to the above configuration, the rack bush is placed at a position relatively close to the first pinion shaft for transmission of steering auxiliary force, rather than to the second pinion shaft for transmission of manual steering effort. Accordingly, the rack bush more effectively improves the contact ratio of the first pinion with respect to the first rack, thereby making it possible to more effectively reduce meshing sound between the first pinion for transmission of steering auxiliary force and the first rack corresponding thereto which meshing sound is generally larger than meshing sound between the second pinion for transmission of manual steering effort and the second rack corresponding thereto.

Further, in the above configuration, the rack shaft may include a first end portion closer to the first pinion shaft than the second pinion shaft, and a second end portion placed at a side opposite to the first end portion, and the steering system may further include a second rack bush held by the housing so as to be separated from a first rack bush serving as the rack bush, and supporting the first end portion of the rack shaft slidably in the axial direction.

In the above configuration, that first end portion of the rack shaft which is close to the first pinion shaft for transmission of steering auxiliary force is slidably supported by the second rack bush. The meshing between the first pinion for transmission of steering auxiliary force and the first rack corresponding thereto generates meshing sound that is generally larger than meshing sound between the second pinion for transmission of manual steering effort and the second rack corresponding thereto. However, according to the above configuration, it is possible to improve a contact ratio in the meshing between the first pinion and the first rack, thereby making it possible to increase a noise prevention effect.

A third aspect of the invention is such that a steering system includes: a housing; a rack shaft passing through the housing and having a first end portion and a second end portion which are opposite to each other in an axial direction, the rack shaft including, on the same side relative to a central axis thereof, a first rack close to the first end portion out of these end portions, and a second rack close to the second end portion out of the end portions; a first pinion shaft including a first pinion meshing with the first rack; a second pinion shaft including a second pinion meshing with the second rack, the second pinion shaft being placed on the same side as the first pinion shaft relative to a plane including the central axis of the rack shaft and parallel to a central axis of the first pinion shaft; a first rack guide held by the housing and biasing the rack shaft from a back of the first rack toward the first pinion; a second rack guide held by the housing and biasing the rack shaft from a back of the second rack toward the second pinion; a second rack bush supported by the housing, supporting the first end portion of the rack shaft slidably in the axial direction, and biasing the rack shaft toward the first pinion; and a first rack bush supported by the housing, supporting the first end portion of the rack shaft slidably in the axial direction, and biasing the rack shaft toward the first pinion and the second pinion.

According to the above aspect, a biasing force by the second rack bush placed at the first end portion of the rack shaft and biasing the rack shaft toward the first pinion generates a moment in a direction where the rack shaft is separated from the second pinion, where a position at which the rack shaft is sandwiched between the first pinion and the first rack guide is taken as a supporting point. Since the first rack bush biases the rack shaft toward both of the pinions against the moment thus generated by the second rack bush, it is possible to restrain an increase of backlash between the second pinion and the second rack.

In the above aspect, the first rack bush may be placed between the first pinion shaft and the second pinion shaft in the axial direction of the rack shaft.

According to the above configuration, the first rack bush placed between the first pinion shaft and the second pinion shaft in terms of the axial direction of the rack shaft generates a moment resisting the moment generated by the second rack bush, where a position at which the rack shaft is sandwiched between the first pinion and the first rack guide is taken as a supporting point. This makes it surely possible to restrain an increase of backlash between the second pinion and the second rack.

In the above aspect, the first pinion shaft may be a shaft for transmission of steering auxiliary force, the second pinion shaft may be a shaft for transmission of manual steering effort, and only the first rack bush and the second rack bush may be provided as bearings for supporting the rack shaft.

If a rack bush is placed at that second end portion of the rack shaft which is close to the second pinion for transmission of manual steering effort, the rack bush is placed distant from the supporting point, and therefore, the rack bush generates a large moment with the supporting point as a center. Against the large moment, the second rack bush will generate a large reaction force moment component. Accordingly, both of the rack bush placed at the second end portion and the second rack bush generate a large frictional resistance to the rack shaft, which may impair steering feeling. In contrast, according to the above configuration, since no rack bush is placed at the second end portion, it is possible to restrain an increase of the frictional resistance to the movement of the rack shaft and to obtain good steering feeling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
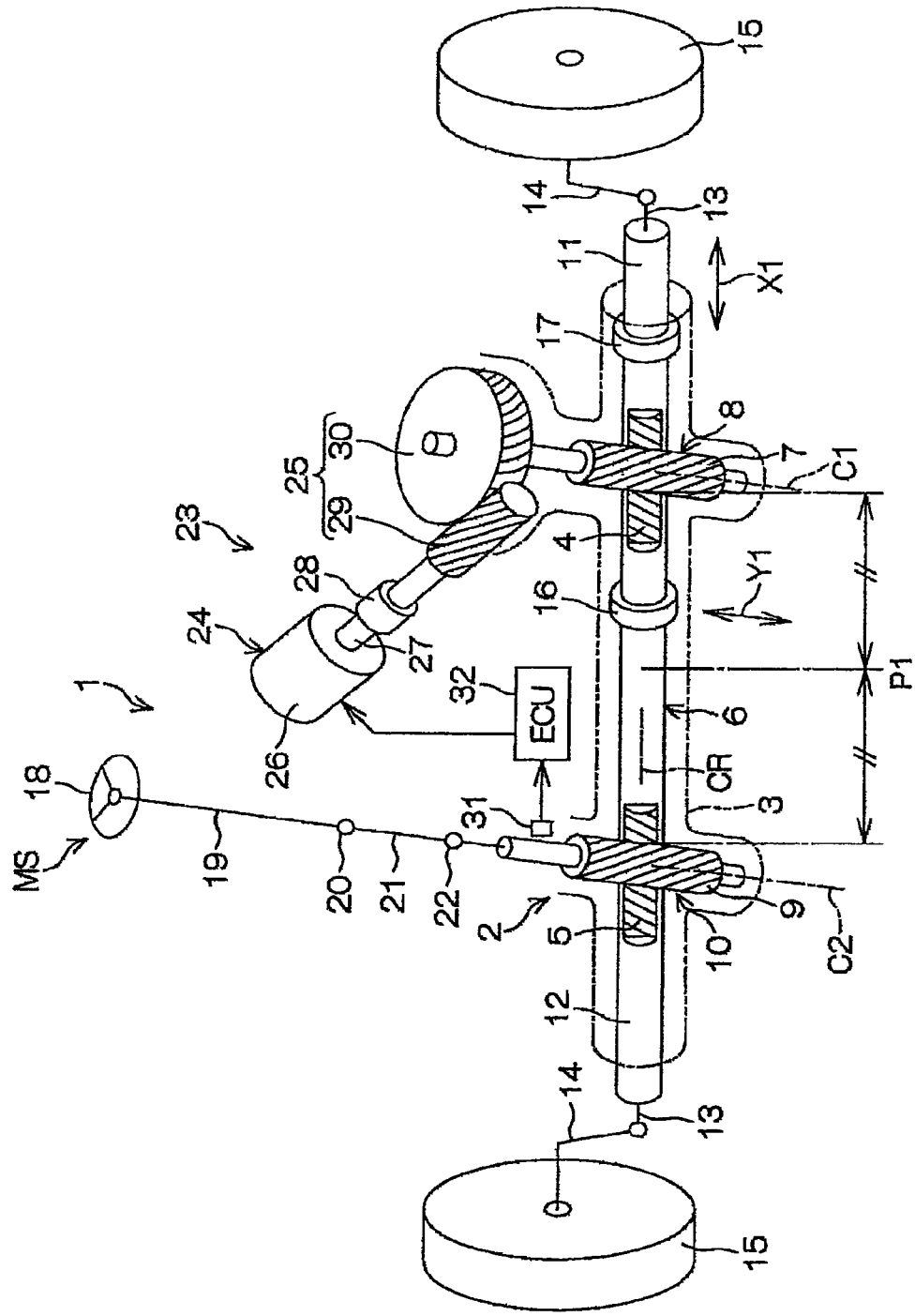
FIG. 1 is a schematic view of a steering system according to one embodiment of the invention.

The following describes embodiments of the invention in detail with reference to the attached drawings. FIG. 1 is a schematic view of a steering system according to one embodiment of the invention. Referring now to FIG. 1, a steering system 1 includes a steered mechanism 2 constituted by a rack-and-pinion mechanism. The steered mechanism 2 includes: a rack shaft 6 which passes through a tubular first housing 3 (corresponding to a rack housing) fixed to a vehicle body, and which serves as a steered shaft including a first rack 4 having helical teeth and a second rack 5 having helical teeth, the first rack 4 and the second rack 5 being separated from each other in an axial direction X1; a first pinion shaft 8 including a first pinion 7 that has helical teeth and meshes with the first rack 4; a second pinion shaft 10 including a second pinion 9 that has helical teeth and meshes with the second rack 5; and steered wheels 15 respectively connected to a first end portion U and a second end portion 12 of the rack shaft 6 in the axial direction X1 via respective tie rods 13 and respective knuckles 14.

The second pinion shaft 10 is a shaft for transmission of manual steering effort, and transmits manual steering effort that a driver gives to a steering member 18 such as a steering wheel. That is, the steering member 18 is connected to the second pinion shaft 10 via a steering shaft 19, a universal joint 20, an intermediate shaft 21, and a universal joint 22 in a torque transmittable manner. When the driver operates the steering member 18, it is possible to steer the steered wheels 15 due to its manual steering effort (steering torque) via the steering shaft 19, the universal joint 20, the intermediate shaft 21, the universal joint 22, the second pinion shaft 10, the rack shaft 6, the tie rods 13, and the knuckles 14. That is, a manual steering system MS is constituted by the steering member 18, the steering shaft 19, the universal joint 20, the intermediate shaft 21, the universal joint 22, the second pinion shaft 10, and the rack shaft 6.

The first pinion shaft 8 is a shaft for transmission of steering auxiliary force. That is, the steering system 1 includes a steering auxiliary mechanism 23. The steering auxiliary mechanism 23 includes an electric motor 24 for generating steering auxiliary force, and a speed reduction mechanism 25, such as a worm gear mechanism, for slowing down a rotary output from the electric motor 24 and transmitting it to the first pinion shaft 8. The electric motor 24 includes a motor housing 26 fixed to the vehicle body, and a rotation axis 27 serving as an output shaft. The speed reduction mechanism 25 includes a drive gear 29, such as a worm shaft, connected to the rotation axis 27 via a joint 28 in a torque transmittable manner, and a driven gear 30, such as a worm wheel, meshing with the drive gear 29 and connected to the first pinion shaft 8 in an integrally rotatable manner.

At a given position in a path from the steering shaft 19 of the manual steering system MS to the second pinion shaft 10, a torque sensor 31 for detecting a steering torque added to the steering member 18 is placed. A torque detection result of the torque sensor 31 is given to an ECU (Electronic Control Unit) 32. The ECU 32 performs a driving control on the electric motor 24 via a built-in drive circuit based on the torque detection result, a vehicle speed detection result received from a vehicle speed sensor (not shown), and the like. An output rotation from the electric motor 24 is slowed down via the speed reduction mechanism 25 and is transmitted to the first pinion shaft 8 so as to be converted into a linear motion of the rack shaft 6, and thus steering is assisted.

Figure 2:
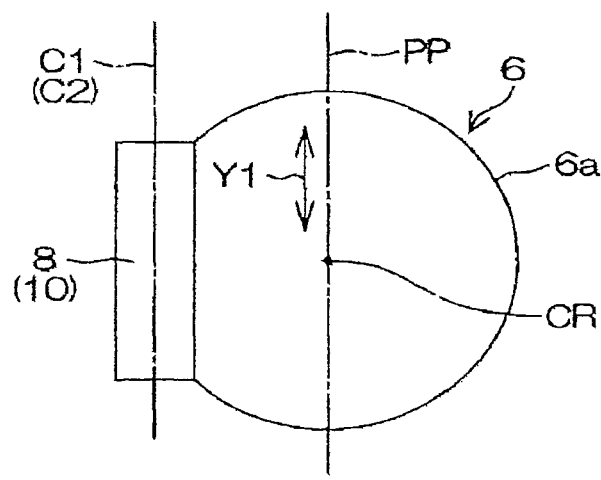
FIG. 2 is a schematic side view of a rack shaft and pinion shafts in the steering system of FIG. 1, and illustrates an arrangement state of the pinion shafts, viewed from an axial direction of the rack shaft.
Figure 3:
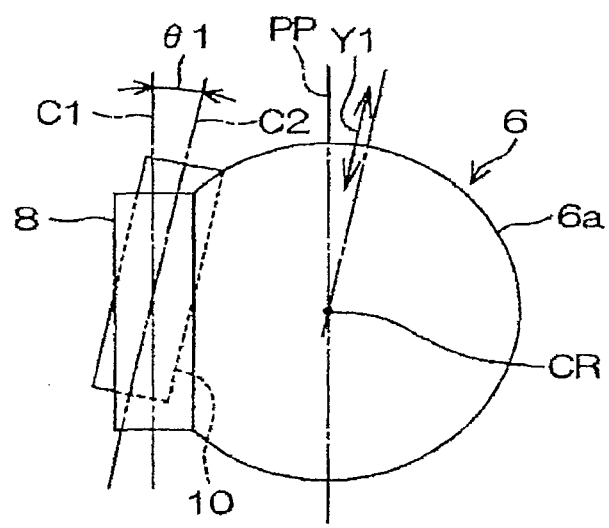
FIG. 3 is a schematic side view of the rack shaft and the pinion shafts, and illustrates a modified example of the arrangement state of the pinion shafts, viewed from the axial direction of the rack shaft.

The first rack 4 and the second rack 5 have respective helical teeth inclined toward the same side relative to the axial direction X1 of the rack shaft 6. Further, the first rack 4 and the second rack 5 are provided on a surface on the same side relative to a central axis CR of the rack shaft 6, and the first pinion shaft 8 and the second pinion shaft 10 are placed on the same side relative to the rack shaft 6. As illustrated in FIG. 2 or 3, which is a schematic view in which the rack shaft 6 is viewed from its axial direction (a direction perpendicular to a plane of paper of FIGS. 2 and 3 corresponds to the axial direction X1 of the rack shaft 6), the second pinion shaft 10 is placed on the same side as the first pinion shaft 8 relative to a plane PP including the central axis CR of the rack shaft 6 and parallel to a central axis C1 of the first pinion shaft 8.

The first pinion shaft 8 and the second pinion shaft 10 are placed substantially in parallel to each other. More specifically, when viewed from the axial direction of the rack shaft 6, the central axis C1 of the first pinion shaft 8 coincides with a central axis C2 of the second pinion shaft 10 as illustrated in FIG. 2, or an absolute value $|θ1|$ of an angle $θ1$ formed by the central axis C1 of the first pinion shaft 8 and the central axis C2 of the second pinion shaft 10 is set to an angle within $0<|θ1|≤30°$, as illustrated in FIG. 3.

Figure 4:
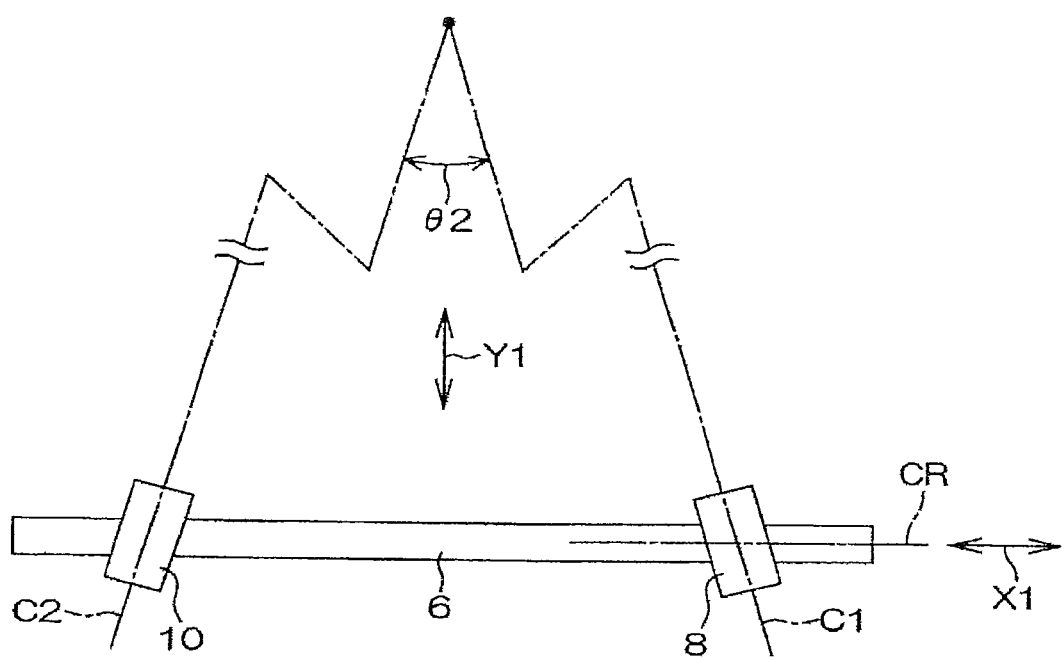
FIG. 4 is a schematic side view of the rack shaft and the pinion shafts, and illustrates a modified example of the arrangement state of the pinion shafts, viewed from a direction perpendicular to a central axis of the rack shaft and a central axis of a first pinion shaft.
Figure 9:
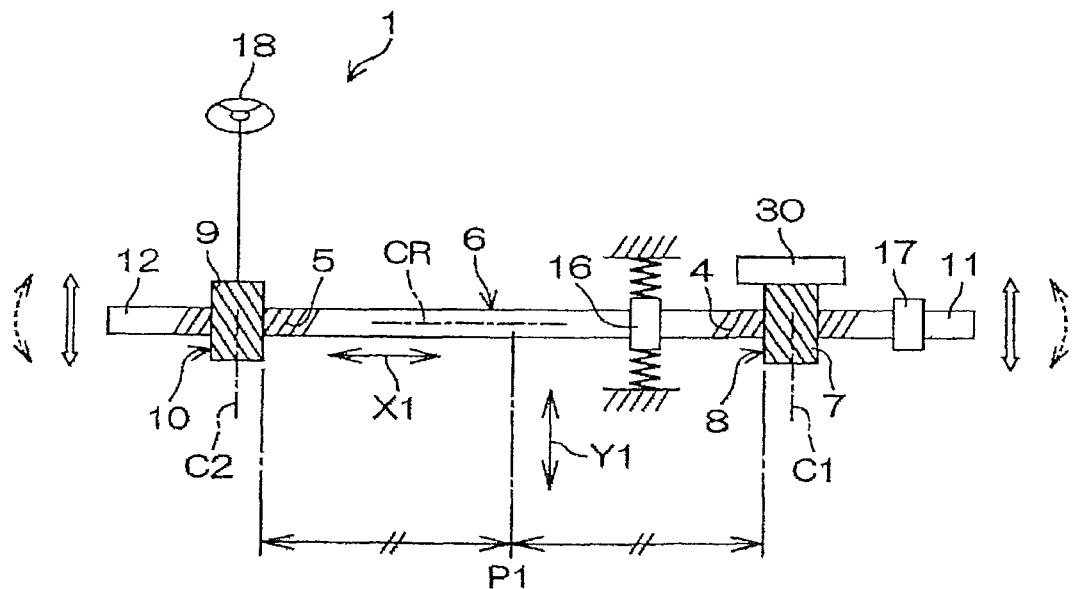
FIG. 9 is a schematic view of a structure for supporting the rack shaft in the steering system of FIG. 1.

Further, when viewed from a direction perpendicular to both of the central axis CR of the rack shaft 6 and the central axis C1 of the first pinion shaft 8, the central axis C1 of the first pinion shaft 8 is parallel to the central axis C2 of the second pinion shaft 10 as illustrated in FIG. 1 or 9, or an absolute value $|θ2|$ of an angle $θ2$ formed by the central axis C1 of the first pinion shaft 8 and the central axis C2 of the second pinion shaft 10 is set to an angle within $0<|θ2|≤30°$, as illustrated in FIG. 4.

Again with reference to FIG. 1, the rack shaft 6 is held by the first housing 3, and slidably supported by a first rack bush 16 and a second rack bush 17 that are separated from each other in the axial direction X1 of the rack shaft 6. In FIG. 1, the first rack bush 16 and the second rack bush 17 are illustrated schematically. The first rack bush 16 has a function to limit a movement of the rack shaft 6 in a direction Y1 substantially parallel to both of the pinion shafts 8, 10. As illustrated in FIG. 2, in a case where the central axes C1, C2 of the pinion shafts 8, 10 coincide with each other when viewed from the axial direction of the rack shaft 6, the direction Y1 substantially parallel to both of the pinion shafts 8, 10 indicates a direction parallel to the central axes C1, C2 of the pinion shafts 8, 10, or a direction inclined at an angle within 30° with respect to the parallel direction. As illustrated in FIG. 3, in a case where the central axes C1, C2 of the pinion shafts 8, 10 are inclined with respect to each other when viewed from the axial direction of the rack shaft 6, the direction Y1 indicates a direction between a direction parallel to the central axis C1 of the first pinion shaft 8 and a direction parallel to the central axis C2 of the second pinion shaft 10.

The first rack bush 16 is placed between the pinion shafts 8, 10 in terms of the axial direction X1 of the rack shaft 6. More specifically, the first rack bush 16 is placed closer to the first pinion shaft 8 than a central position P1 between the first pinion shaft 8 and the second pinion shaft 10 in terms of the axial direction X1 of the rack shaft 6. The first end portion 11 of the rack shaft 6 is close to the first pinion shaft 8 and distant from the second pinion shaft 10. Further, the second end portion 12 of the rack shaft 6 is an end portion Opposite to the first end portion 11, and is close to the second pinion shaft 10 and distant from the first pinion shaft 8. The second rack bush 17 supports the first end portion 11 of the rack shaft 6 slidably in the axial direction X1, and functions to bias the rack shaft 6 toward the first pinion 7. The first rack bush 16 is placed between the pinion shafts 8, 10 in terms of the axial direction X1 of the rack shaft 6. The first rack bush 16 functions to bias the rack shaft 6 toward the first pinion 7 and the second pinion 9.

Figure 5:
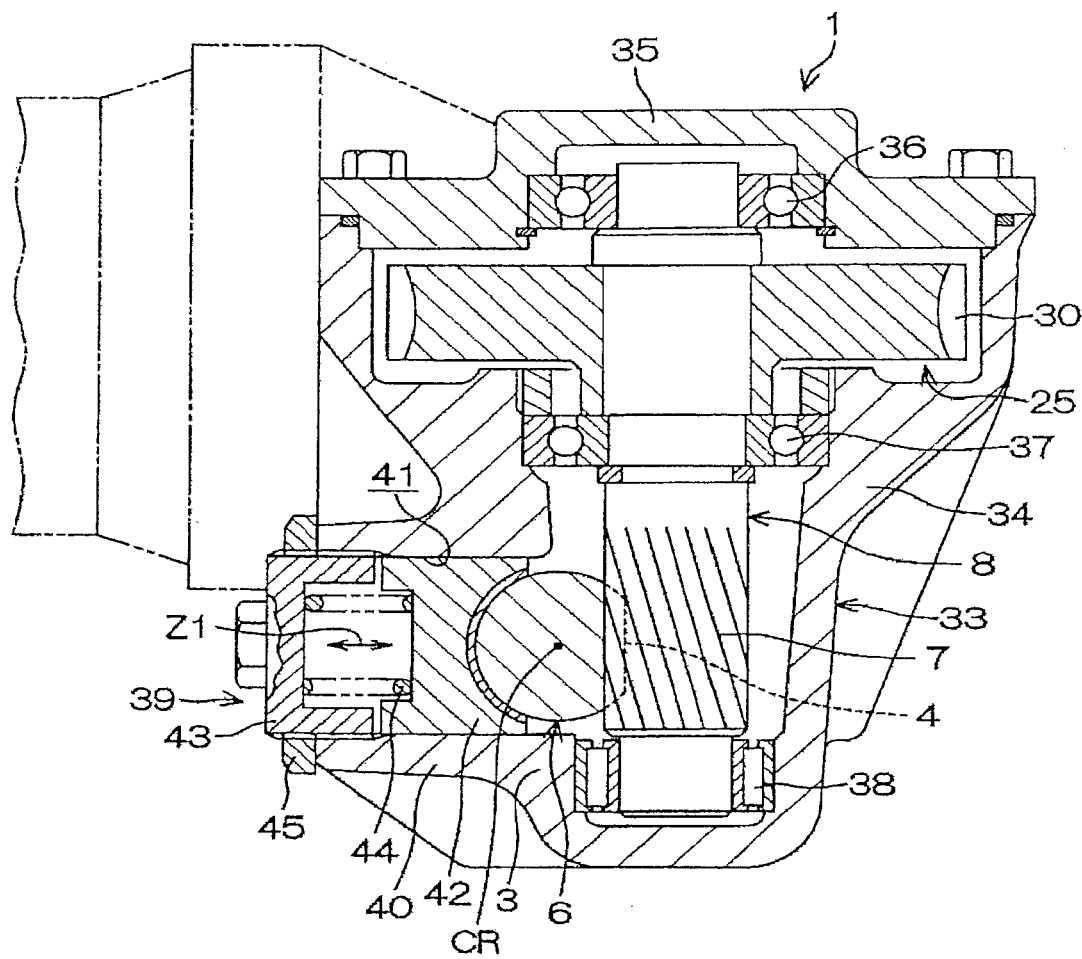
FIG. 5 is a schematic sectional view of an essential part of the steering system of FIG. 1, and illustrates a section taken along the central axis of the first pinion shaft for transmission of steering auxiliary force.

More specifically, the first rack bush 16 is placed closer to the first pinion shaft 8 than the central position P1 between the first pinion shaft 8 and the second pinion shaft 10 in terms of the axial direction X1 of the rack shaft 6. FIG. 5 is a schematic sectional view of an essential part of the steering system 1, taken along the central axis of the first pinion shaft 8 for transmission of steering auxiliary force. As illustrated in FIG. 5, a tubular second housing 33 continued, in a crossing manner, from the first housing 3 where the rack shaft 6 passes through is provided. The rack shaft 6 passes through the second housing 33, and the first pinion shaft 8 and the speed reduction mechanism 25 are accommodated in the second housing 33.

The second housing 33 includes a body portion 34 in which the first pinion shaft 8 and the driven gear 30 are accommodated, a cover portion 35 for closing an opening at one end of the body portion 34, and a drive gear accommodation portion (not shown) continued to the body portion 34 and accommodating the drive gear 29 therein.

The first pinion shaft 8 is supported rotatably by a first bearing 36 supported by the cover portion 35 and constituted, for example, by a ball bearing, and a second bearing 37 supported by the body portion 34 and constituted, for example, by a ball bearing. The driven gear 30 is placed between the first bearing 36 and the second bearing 37 in terms of an axial direction of the first pinion shaft 8. Further, a tip portion of the first pinion shaft 8 is supported rotatably by a third bearing 38 supported by the body portion 34 and constituted, for example, by a needle roller bearing. The first pinion 7 is placed between the second bearing 37 and the third bearing 38 in terms of the axial direction of the first pinion shaft 8.

Further, the steering system 1 includes a first rack guide 39 placed at a side opposite to the first pinion shaft 8 across the rack shaft 6 and biasing the rack shaft 6 toward the first pinion 7 from a back of the first rack 4. The first rack guide 39 includes: a tubular first guide housing 40 provided in the body portion 34 of the second housing 33; and a first support yoke 42 which is accommodated in a first retaining hole 41 formed in the first guide housing 40, slidably in a depth direction Z1 of the first retaining hole 41 and its opposite direction and which support the rack shaft 6 slidably in its axial direction (a direction perpendicular to a plane of paper in FIG. 5). Further, the first rack guide 39 includes: a first adjustment screw thread 43 screwed and fixed to an inlet of the first retaining hole 41; a first biasing member 44 received by the first adjustment screw thread 43 and elastically biasing the first support yoke 42 toward the rack shaft 6, the first biasing member 44 being constituted, for example, by a compression coiled spring; and a first lock nut 45 for fixing and locking the first adjustment screw thread 43 to the first guide housing 40.

The first adjustment screw thread 43 regulates an amount of a gap (corresponding to a gap amount between the first adjustment screw thread 43 and the first support yoke 42) that allows the first support yoke 42 to move in terms of the depth direction Z1 and its opposite direction. The first biasing member 44 presses the first rack 4 of the rack shaft 6 against the first pinion 7 of the first pinion shaft 8 via the first support yoke 42. Hereby, a preload is given to a meshing portion between the first rack 4 and the first pinion 7, thereby restraining backlash.

Figure 6:
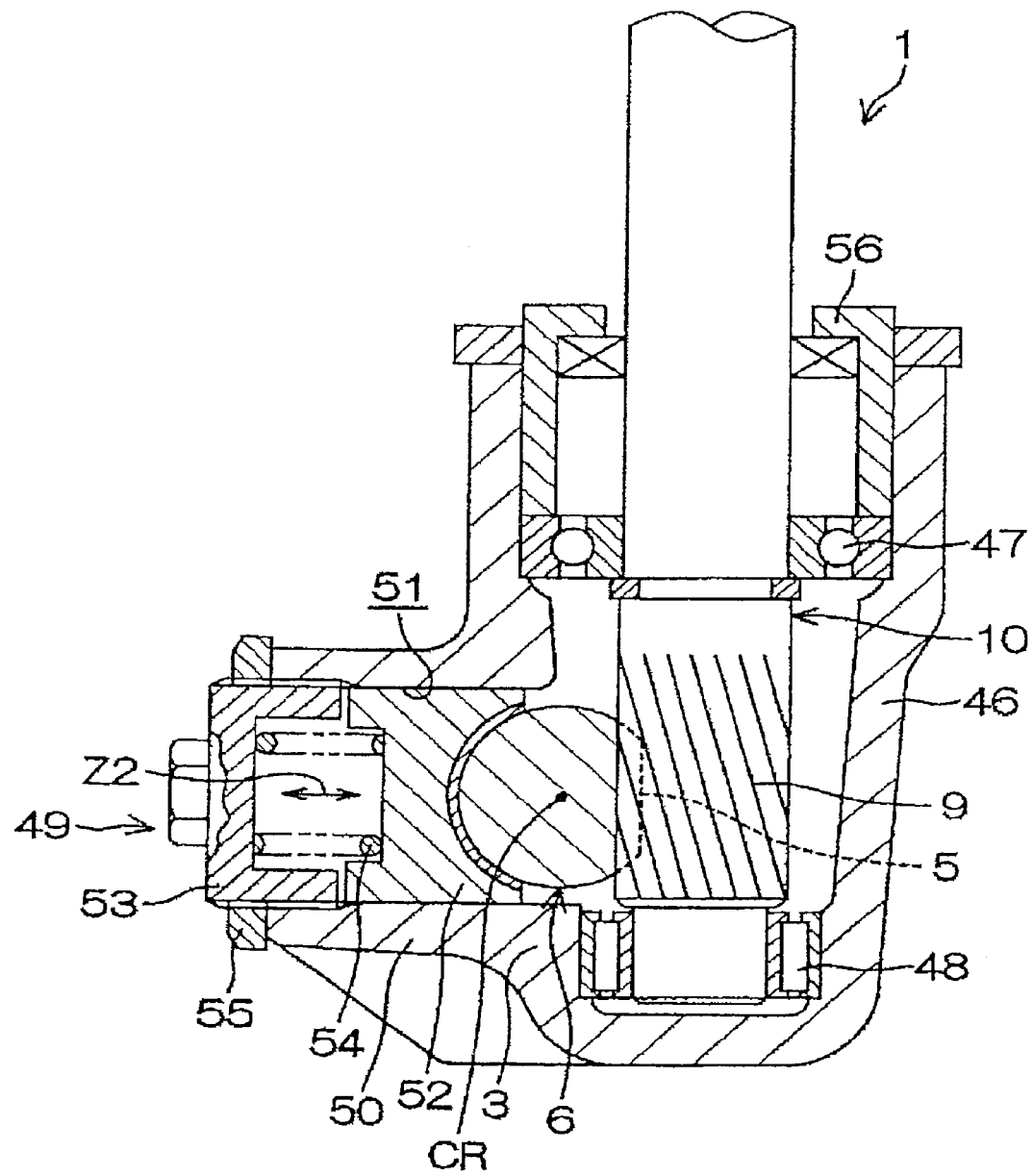
FIG. 6 is a schematic sectional view of an essential part of the steering system of FIG. 1, and illustrates a section taken along a central axis of a second pinion shaft for transmission of manual steering effort.

Subsequently, FIG. 6 is a schematic sectional view of an essential part of the steering system 1, taken along the central axis of the second pinion shaft 10 for transmission of manual steering effort. As illustrated in FIG. 6, a third housing 46 is provided in a crossing manner with respect to the first housing 3 where the rack shaft 6 passes through. The rack shaft 6 passes through the third housing 46, and the second pinion shaft 10 is accommodated in the third housing 46.

The second pinion shaft 10 is rotatably supported by a fourth bearing 47 supported by the third housing 46 and constituted, for example, by a ball bearing, and a fifth bearing 48 supported by the third housing 46 and constituted, for example, by a needle roller bearing. The second pinion 9 is placed between the fourth bearing 47 and the fifth bearing 48 in terms of an axial direction of the second pinion shaft 10. Further, the steering system 1 includes a second rack guide 49 placed at a side opposite to the second pinion shaft 10 across the rack shaft 6 and biasing the rack shaft 6 toward the second pinion 9 from a back of the second rack 5.

The second rack guide 49 includes: a tubular second guide housing 50 provided in the third housing 46; and a second support yoke 52 which is accommodated in a second retaining hole 51 formed in the second guide housing 50, slidably in a depth direction Z2 of the second retaining hole 51 and its opposite direction and which supports the rack shaft 6 slidably in its axial direction (a direction perpendicular to a plane of paper in FIG. 5). Further, the second rack guide 49 includes: a second adjustment screw thread 53 screwed and fixed to an inlet of the second retaining hole 51; a second biasing member 54 received by the second adjustment screw thread 53 and elastically biasing the second support yoke 52 toward the rack shaft 6, the second biasing member 54 being constituted, for example, by a compression coiled spring; and a second lock nut 55 for fixing and locking the second adjustment screw thread 53 to the second guide housing 50.

The second adjustment screw thread 53 regulates an amount of a gap (corresponding to a gap amount between the second adjustment screw thread 53 and the second support yoke 52) that allows the second support yoke 52 to move in terms of the depth direction Z2 and its opposite direction. The second biasing member 54 presses the second rack 5 of the rack shaft 6 against the second pinion 9 of the second pinion shaft 10 via the second support yoke 52. Hereby, a preload is given to a meshing portion between the second rack 5 and the second pinion 9, thereby restraining backlash.

Figure 7:
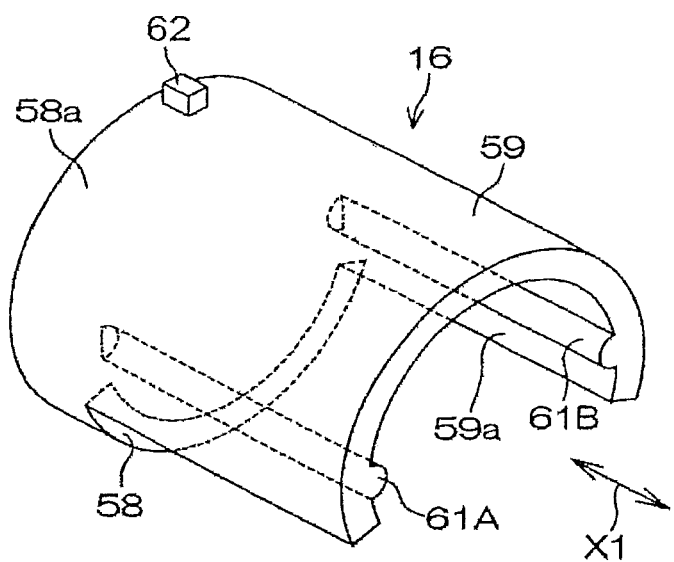
FIG. 7 is a schematic perspective view of a first rack bush.
Figure 8A:
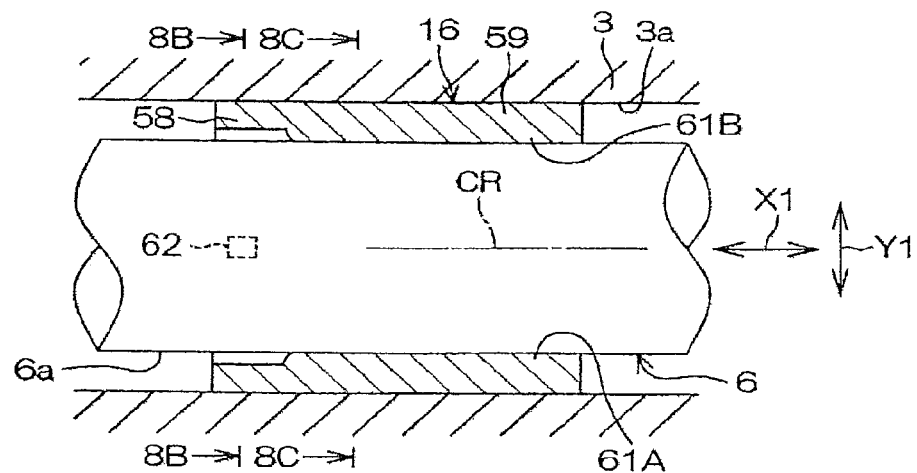
FIG. 8A is a schematic sectional view of a support structure by the first rack bush.

One end of the second pinion shaft 10 passes through a cover member 56 screwed and fixed to an opening at one end of the third housing 46, so as to project from the third housing 46, and is connected to the intermediate shaft 21 via the universal joint 22, although not illustrated in FIG. 6 (see FIG. 1). As illustrated in FIGS. 7 and 8A, the first rack bush 16 includes an annular portion 58 surrounding a whole circumference of the rack shaft 6, and a circular-arc-section portion 59 axially extending from the annular portion 58, and the first rack bush 16 is formed of resin, for example. An outer circumference 58a of the annular portion 58 is provided with an engageable projection portion 62 projecting radially outwardly. Further, an inner circumference 59a of the circular-arc-section portion 59 is provided with paired elastic projection portions 61A, 61B having a mound-shaped section and formed as protrusions extending axially.

Figure 8B:
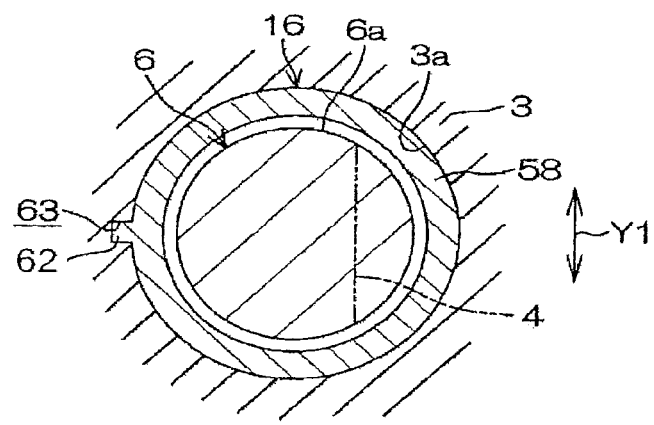
FIG. 8B is a sectional view along a line 8B-8B of FIG. 8A, and illustrates a relationship between an annular portion of the first rack bush and the rack shaft.
Figure 8C:
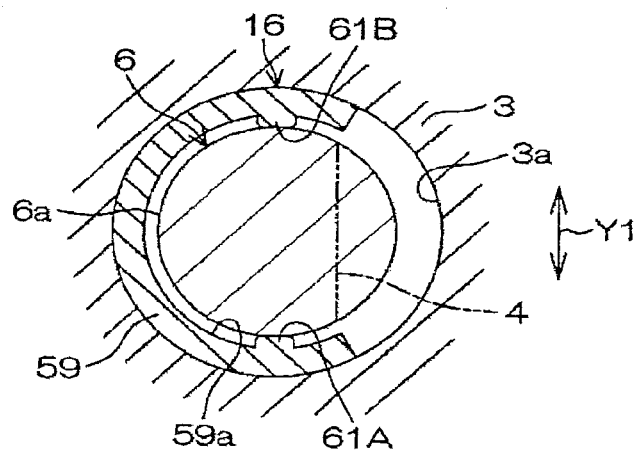
FIG. 8C is a sectional view along a line 8C-8C of FIG. 8A, and illustrates a relationship between a circular-arc-section portion of the first rack bush and the rack shaft.

As illustrated in FIG. 8B, which is a sectional view along a line 8B-8B of FIG. 8A, the engageable projection portion 62 on the outer circumference 58a of the annular portion 58 engages with an engageable recessed portion 63 provided on an inner circumference 3a of the first housing 3. The engagement between the engageable projection portion 62 and the engageable recessed portion 63 regulates a rotation and an axial movement of the first rack bush 16. As illustrated in FIG. 8C, which is a sectional view along a line 8C-8C of FIG. 8A, the paired elastic projection portions 61A, 61B are placed at positions radially opposed to each other with the rack shaft 6 sandwiched therebetween, on the inner circumference 59a of the circular-arc-section portion 59, and function to press an outer circumference 6a of the rack shaft 6 so as to elastically bias the rack shaft 6 in respective directions opposite to each other along the direction Y1 substantially parallel to the first pinion shaft 8. The first rack bush 16 includes, as a biasing portion for biasing the rack shaft 6, only the elastic projection portions 61A, 61B for biasing the rack shaft 6 in the direction Y1 substantially parallel to both of the pinion shafts 8, 10.

That is, as illustrated in FIG. 9, which is a schematic view, the paired elastic projection portions 61A, 61B function to limit a movement (a translational motion: shown by a void arrow in FIG. 9) of the rack shaft 6 in the direction Y1 substantially parallel to both of the pinion shafts 8, 10. The second rack bush 17 is fowled of resin, for example, in a cylindrical shape. Although not illustrated herein, an outer circumference of the second rack bush 17 is provided with elastic projection portions separated at even intervals in a circumferential direction, and elastic deformation of these elastic projection portions allows bending of the rack shaft 6.

According to the present embodiment, the racks 4, 5 meshing with the respective pinions 7, 9 have respective helical teeth inclined toward the same side relative to the axial direction X1 of the rack shaft 6, and the second pinion shaft 10 is placed on the same side as the first pinion shaft 8 relative to the plane PP including the central axis CR of the rack shaft 6 and parallel to the central axis C1 of the first pinion shaft 8. Accordingly, the rack shaft 6 tends to perform a translational motion in the direction Y1 substantially parallel to both of the pinion shafts 8, 10. However, since the rack bush (the first rack bush 16) for limiting the movement of the rack shaft 6 in the direction Y1 substantially parallel to both of the pinion shafts 8, 10 is placed between the respective pinion shafts 8, 10 in terms of the axial direction X1 of the rack shaft 6, it is possible to efficiently limit the movement (the translational motion: shown by the void arrow in FIG. 9) of the rack shaft 6 in the direction Y1 substantially parallel to both of the pinion shafts 8, 10. This improves contact ratios of the pinions 7, 9 with respect to their corresponding racks (the first rack 4 and the second rack 5) of the rack shaft 6, thereby making it possible to reduce meshing sound.

Further, since the rack bush (the first rack bush 16) includes, as a biasing portion for biasing the rack shaft 6, the elastic projection portions 61A, 61B for biasing the rack shaft 6 in the direction Y1 substantially parallel to both of the pinion shafts 8, 10, it is possible to effectively restrain the translational motion of the rack shaft 6, thereby achieving static sound. Particularly, the rack bush (the first rack bush 16) includes, as a biasing portion for biasing the rack shaft 6, only the elastic projection portions 61A, 61B for biasing the rack shaft 6 in the direction Y1 substantially parallel to both of the pinion shafts 8, 10. This accordingly makes it possible to improve steering feeling by restraining excessive meshing force between the respective racks 4, 5 and their corresponding pinions 7, 9, while restraining the translational motion of the rack shaft 6 so as to achieve noise reduction.

Further, since the first pinion shaft 8 is a shaft for transmission of steering auxiliary force and the second pinion shaft 10 is a shaft for transmission of manual steering effort, it is possible to improve a contact ratio of the first pinion 7 for transmission of steering auxiliary force, with respect to the first rack 4, and to improve a contact ratio of the second pinion 9 for transmission of manual steering effort, with respect to the second rack 5. Further, the first rack bush 16 is placed closer to the first pinion shaft 8 than the central position P1 between the first pinion shaft 8 and the second pinion shaft 10 in terms of the axial direction X1 of the rack shaft 6. That is, the first rack bush 16 is placed at a position relatively close to the first pinion shaft 8 for transmission of steering auxiliary force than the second pinion shaft 10 for transmission of manual steering effort. Accordingly, the first rack bush 16 more effectively improves the contact ratio of the first pinion 7 with respect to the first rack 4, thereby making it possible to more effectively reduce meshing sound between the first pinion 7 and the first rack 4 which meshing sound is generally larger than meshing sound between the second pinion 9 and the second rack 5.

Further, in the end portions 11, 12 of the rack shaft 6, 12, that first end portion 11 of the rack shaft 6 which is close to the first pinion shaft 8 for transmission of steering auxiliary force is slidably supported by the second rack bush 17. The meshing between the first pinion 7 and the first rack 4 corresponding thereto generates meshing sound that is generally larger than the meshing sound between the second pinion 9 and the second rack 5, but the above configuration improves the contact ratio in the meshing between the first pinion 7 and the first rack 4, thereby making it possible to increase a noise prevention effect. Particularly, the second rack bush 17 is able to effectively limit an oscillating motion (shown by a broken line arrow in FIG. 9) of the rack shaft 6 along a plane parallel to both of the pinion shafts 8, 10.

On the other hand, in the end portions 11, 12 of the rack shaft 6, that second end portion 12 of the rack shaft 6 which is close to the second pinion shaft 10 for transmission of manual steering effort may not have a configuration of a rack bush for supporting the second end portion 12, like the present embodiment. Note that the rack bush for supporting the second end portion 12 of the rack shaft 6 may be provided. Further, the second rack guide 49 illustrated in FIG. 6 may be omitted.

Figure 10:
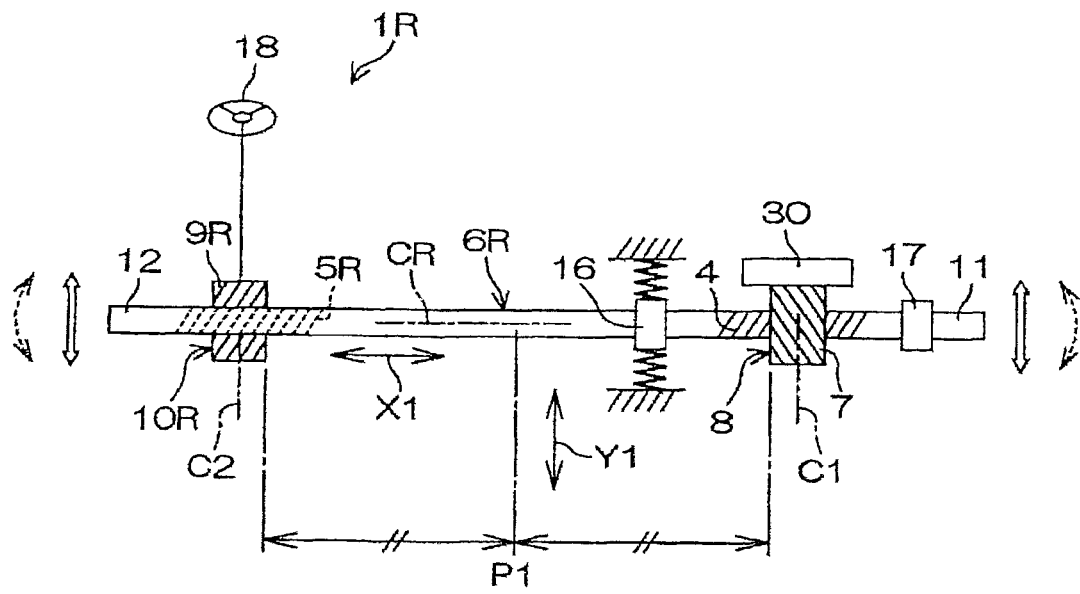
FIG. 10 is a schematic view of a structure for supporting a rack shaft in a steering system according to another embodiment of the invention.

FIG. 10 schematically illustrates a support structure of a rack shaft 6R of a steering system 1R according to another embodiment of the invention. Referring to FIG. 10, the present embodiment is different from the embodiment of FIG. 9 in the following point. That is, in the embodiment of FIG. 9, the first rack 4 and the second rack 5 include respective helical teeth inclined toward the same side relative to the axial direction X1 of the rack shaft 6, and further, as illustrated in FIG. 2 or 3, the first pinion shaft 8 and the second pinion shaft 10 are placed on the same side relative to the plane PP including the central axis CR of the rack shaft 6 and parallel to the central axis C1 of the first pinion shaft 8.

Figure 11:
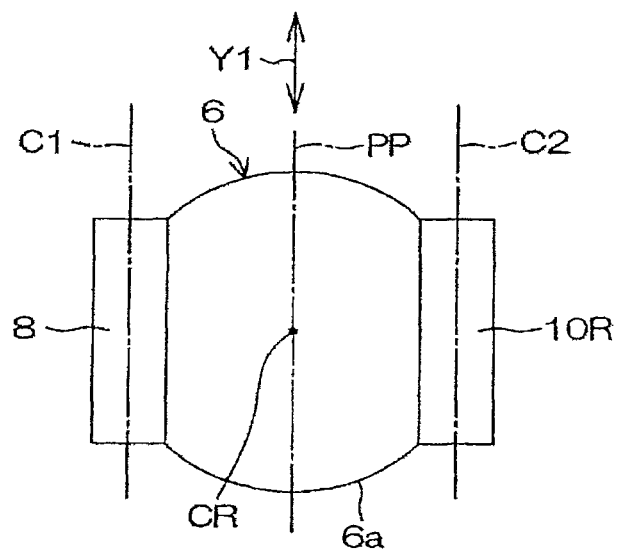
FIG. 11 is a schematic side view of the rack shaft and pinion shafts in the steering system of FIG. 10, and illustrates an arrangement state of the pinion shafts, viewed from an axial direction of the rack shaft.
Figure 12:
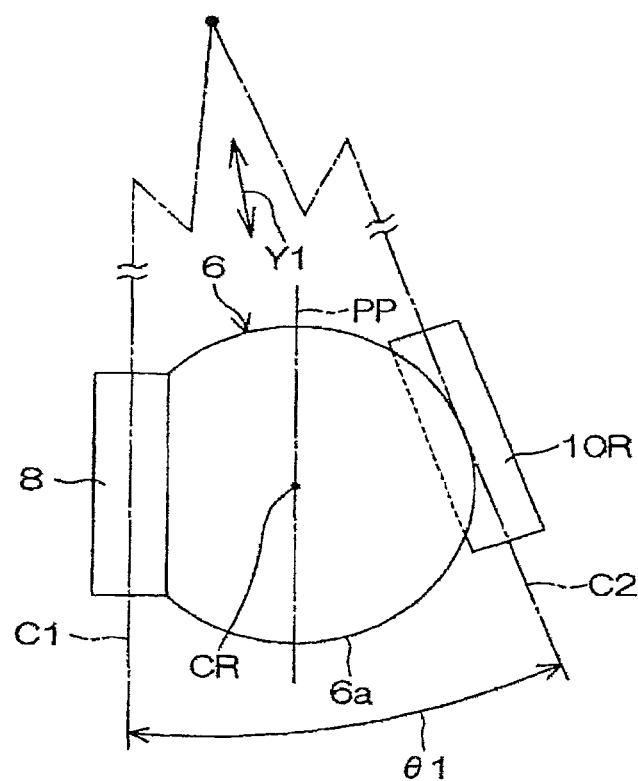
FIG. 12 is a schematic side view of the rack shaft and the pinion shafts, and illustrates a modified example of the arrangement state of the pinion shafts, viewed from the axial direction of the rack shaft.

In contrast, in the present embodiment illustrated in FIG. 10, a first rack 4 and a second rack 5R have respective helical teeth inclined toward the same side with respect to an axial direction X1 of the rack shaft 6R, and further, as illustrated in FIG. 11 or 12, a first pinion shaft 8 and a second pinion shaft 10R are placed on opposite sides to each other relative to a plane PP including a central axis CR of the rack shaft 6R and parallel to a central axis C1 of the first pinion shaft 8. A second pinion 9R of the second pinion shaft 10R meshes with the second rack 5R.

The first pinion shaft 8 and the second pinion shaft 10R are placed substantially in parallel to each other. More specifically, when viewed from the axial direction of the rack shaft 6R, the central axis C1 of the first pinion shaft 8 is parallel to a central axis C2 of the second pinion shaft 10R as illustrated in FIG. 11, or an absolute value |θ1| of an angle θ1 formed by the central axis C1 of the first pinion shaft 8 and the central axis C2 of the second pinion shaft 10R is set to an angle within 0<|θ1|≤30°, as illustrated in FIG. 12.

Figure 13:
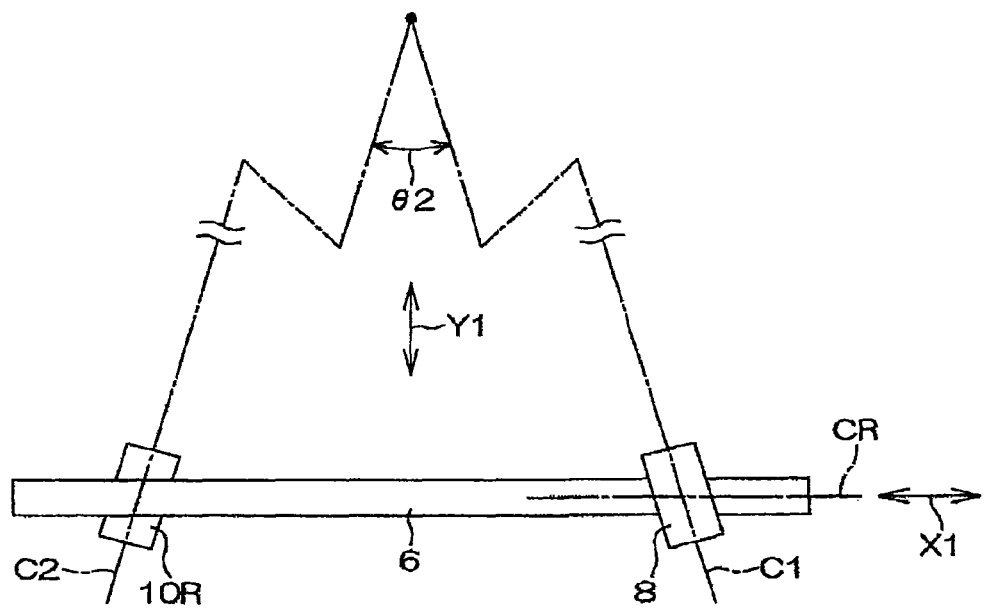
FIG. 13 is a schematic front view of the rack shaft and the pinion shafts, and illustrates an arrangement state of the pinion shafts, viewed from a direction perpendicular to a central axis of the rack shaft and a central axis of a first pinion shaft.
Figure 14:
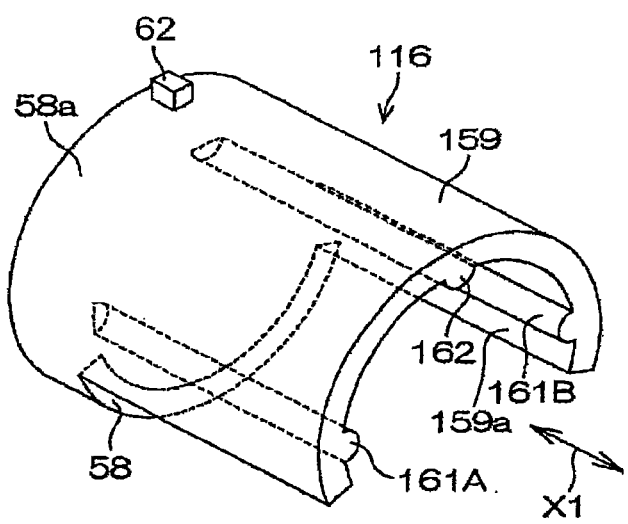
FIG. 14 is a schematic perspective view of a first rack bush in further another embodiment of the invention.

Further, when viewed from a direction perpendicular to both of the central axis CR of the rack shaft 6R and the central axis C1 of the first pinion shaft 8, the central axis C1 of the first pinion shaft 8 is parallel to the central axis C2 of the second pinion shaft 10R as illustrated in FIG. 10, or an absolute value |θ2| of an angle 92 fowled by the central axis C1 of the first pinion shaft 8 and the central axis C2 of the second pinion shaft 10R is set to an angle within 0<|θ2|≤30°, as illustrated in FIG. 13.

A constituent, in the present embodiment, which is the same as a constituent in the embodiment of FIGS. 1 to 9 has the same reference sign as the constituent in the embodiment of FIGS. 1 to 9. Even in the present embodiment, the same effects as in the embodiments of FIGS. 1 to 9 are obtained, and it is possible to efficiently limit a movement (a translational motion: shown by a void arrow in FIG. 10) of the rack shaft 6R in a direction Y1 substantially parallel to both of the pinion shafts 8, 10R. This improves contact ratios of the pinions 7, 9R with respect to their corresponding racks (the first rack 4 and the second rack 5R) of the rack shaft 6R, thereby making it possible to reduce meshing sound.

Subsequently, FIG. 14 and FIGS. 15A, 15B, and 15C illustrate a modified embodiment of the embodiment of FIG. 7 and FIGS. 8A, 8B, and 8C. In the embodiment of FIG. 7 and FIGS. 8A, 8B, and 8C, the first rack bush 16 includes, as a biasing portion for biasing the rack shaft 6, only the elastic projection portions 61A, 61B for biasing the rack shaft 6 in the direction Y1 substantially parallel to both of the pinion shafts 8, 10.

In contrast, in the embodiment of FIG. 14 and FIGS. 15A, 15B, and 15C, paired first elastic projection portions 161A, 161B for biasing a rack shaft 6 in a direction Y1 substantially parallel to both pinion shafts 8, 10, and a second elastic projection portion 162 for biasing the rack shaft 6 toward a side of at least one of pinions 7, 9 are included as a biasing portion for biasing the rack shaft 6. The side of at least one of the pinions 7, 9 is a side where the pinions 7, 9 are provided in a case where both of the pinion shafts 8, 10 are placed on the same side relative to the plane PP as illustrated in FIGS. 9, 2, and 3. In the meantime, in a case where the pinion shafts 8, 10R are placed on opposite sides to each other relative to the plane PP as illustrated in FIGS. 10, 11, and 12, the side of at least one of the pinions 7, 9 is a side where the first pinion 7 for transmission of steering auxiliary force is provided. The paired first elastic projection portions 161A, 161B and the second elastic projection portion 162 are provided on an inner circumference 159a of a circular-arc-section portion 159. A constituent, in the present embodiment, which is the same as a constituent in the embodiment of FIG. 7 and FIGS. 8A, 8B, and 8C has the same reference sign as the constituent in the embodiment of FIG. 7 and FIGS. 8A, 8B, and 8C.

Figure 16:
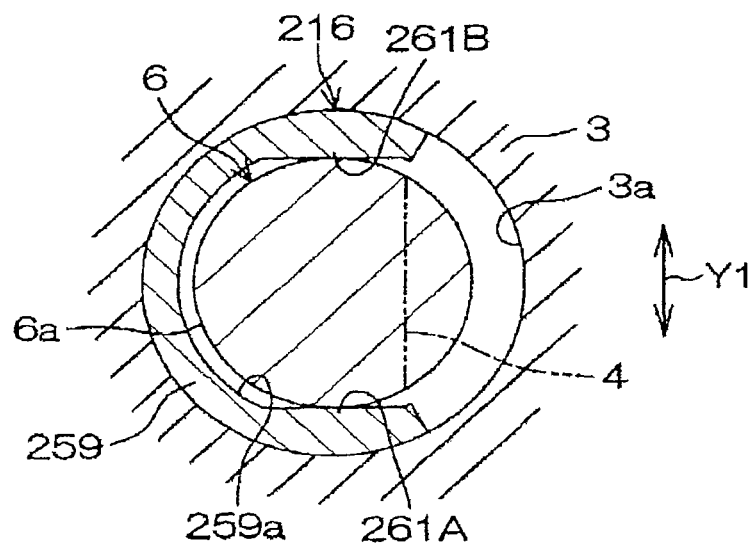
FIG. 16 is a sectional view of a structure for supporting a rack by a first rack bush according to further another embodiment of the invention, and illustrates a modified example of the first rack bush of FIG. 8C.

According to the present embodiment, the second elastic projection portion 162 is able to elastically bias the rack shaft 6 toward at least one of the pinions 7, 9, thereby making it possible to effectively improve a contact ratio of the at least one of the pinions 7, 9 with respect to its corresponding rack 4, 5. The present invention is not limited to each of the above embodiments. For example, in the embodiment of FIG. 8C, the paired elastic projection portions 61A, 61B having a mound-shaped section are provided on the inner circumference 59a of the circular-arc-section portion 59 of the first rack bush 16. Instead of this, as illustrated in FIG. 16, paired elastic projection portions 261A, 261B may be formed such that a circular-arc-shaped inner circumference 259a of a circular-arc-section portion 259 of a first rack bush 216 is partially projected in a flat-surface shape.

Figure 15A:
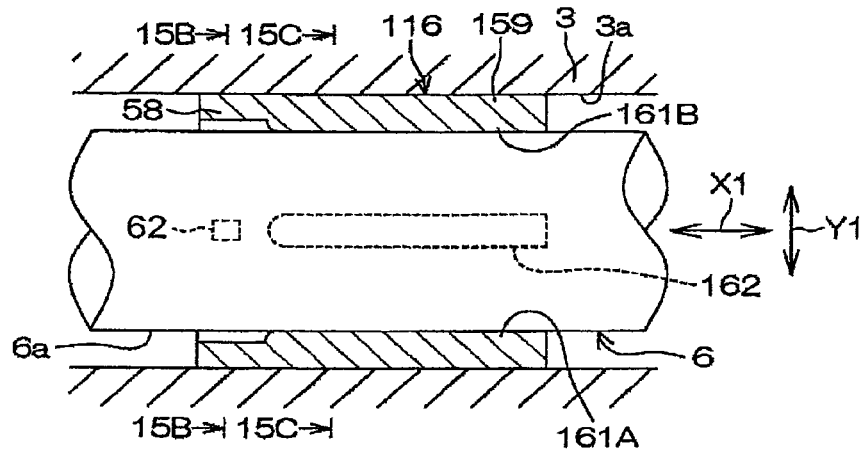
FIG. 15A is a schematic sectional view of a support structure by the first rack bush in FIG. 14.
Figure 15B:
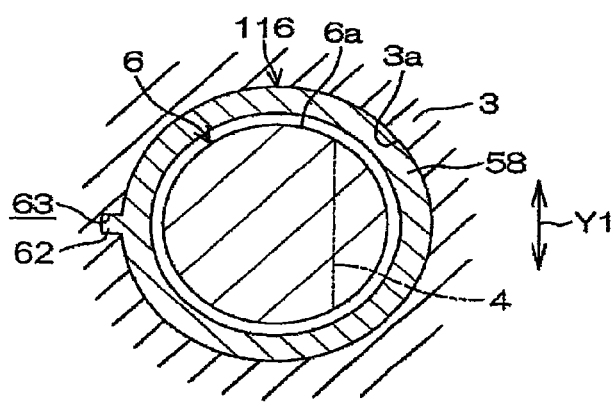
FIG. 15B is a sectional view along a line 15B-15B of FIG. 15A, and illustrates a relationship between an annular portion of the first rack bush and a rack shaft.
Figure 15C:
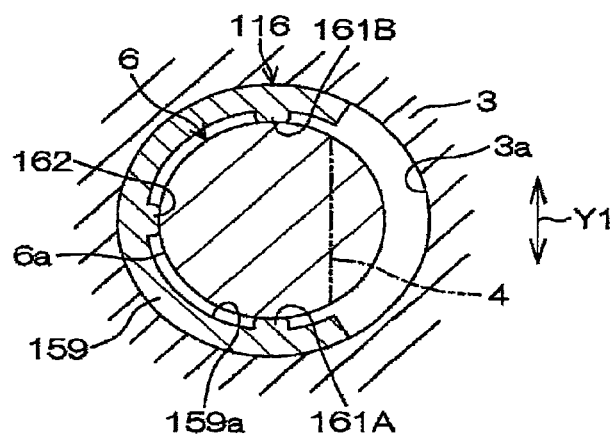
FIG. 15C is a sectional view along a line 15C-15C of FIG. 15A, and illustrates a relationship between a circular-arc-section portion of the first rack bush and the rack shaft.
Figure 17:
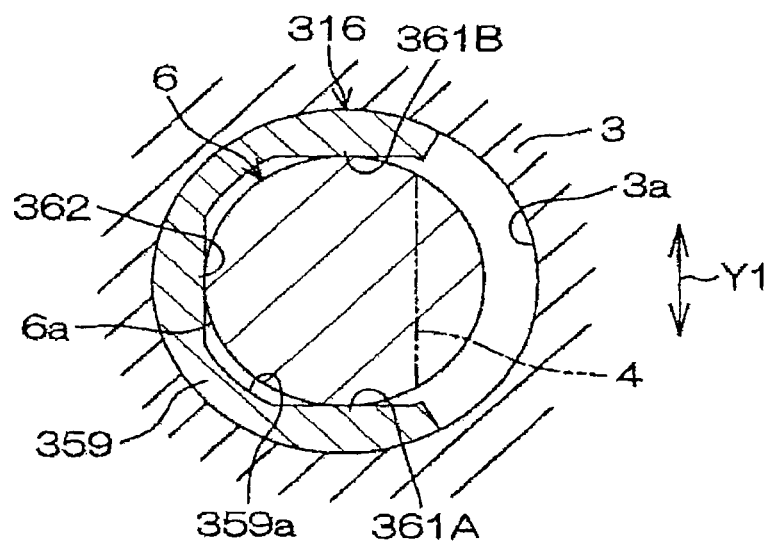
FIG. 17 is a sectional view of a structure for supporting a rack by a first rack bush according to further another embodiment of the invention, and illustrates a modified example of the first rack bush of FIG. 15C.

Further, in the embodiment of FIG. 15C, the paired first elastic projection portions 161A, 161B having a mound-shaped section and the second elastic projection portion 162 having a mound-shaped section are provided on the inner circumference 159a of the circular-arc-section portion 159 of the first rack bush 116. Instead of this, as illustrated in FIG. 17, paired first elastic projection portions 361A, 361B and a second elastic projection portion 362 may be formed such that a circular-arc-shaped inner circumference 359a of a circular-arc-section portion 359 of a first rack bush 316 is partially projected in a flat-surface shape.

Figure 18:
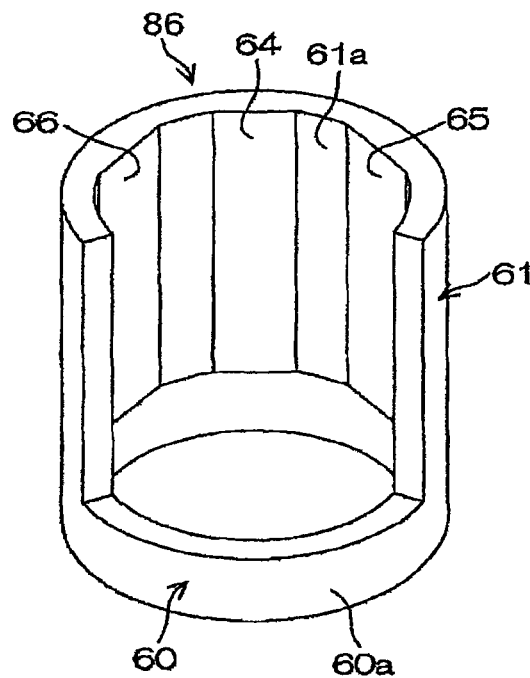
FIG. 18 is a schematic perspective view of a second rack bush.
Figure 19A:
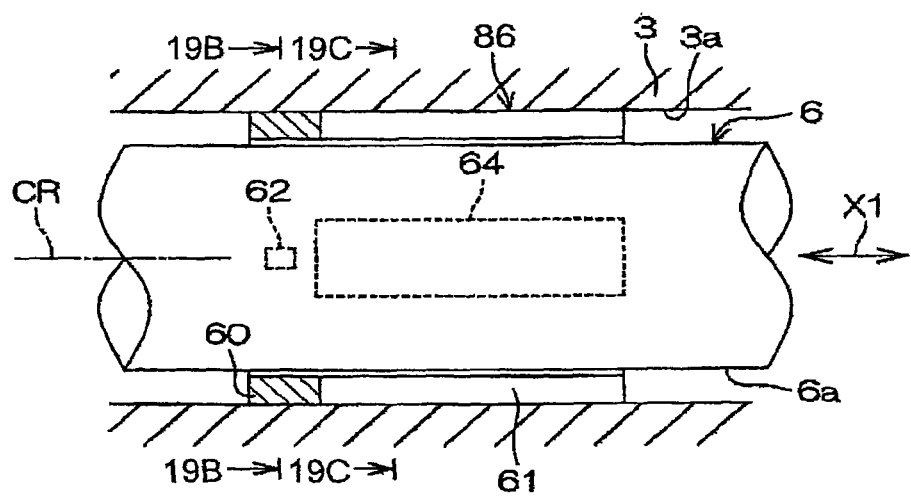
FIG. 19A is a schematic sectional view of a support structure by the second rack bush.

As illustrated in FIGS. 18 and 19A, a second rack bush 86 for supporting a first end portion 11 of a rack shaft 6 and biasing the rack shaft 6 toward a first pinion 7 includes an annular portion 60 supported by a first housing 3 and surrounding a whole circumference of the first end portion 11 of the rack shaft 6, and a circular-arc-section portion 61 axially extending from the annular portion 60. The second rack bush 86 is formed of resin, for example.

Figure 19B:
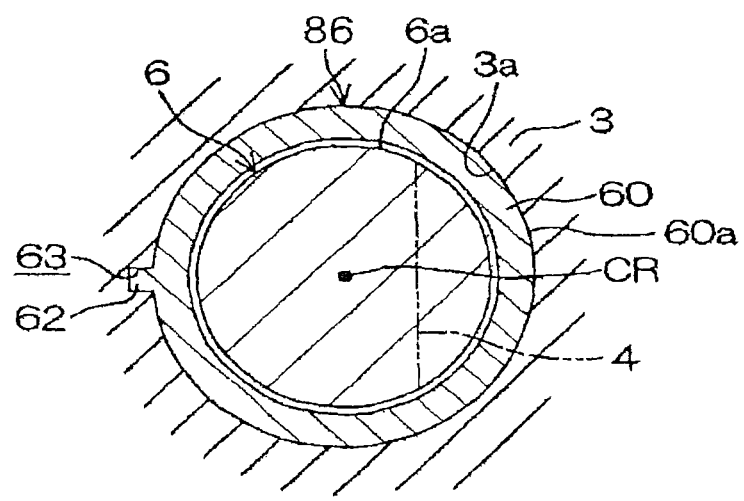
FIG. 19B is a sectional view along a line 19B-19B of FIG. 19A, and illustrates a relationship between an annular portion of the second rack bush and the rack shaft.

As illustrated in FIG. 19B, which is a sectional view along a line 19B-19B of FIG. 19A, an outer circumference 60a of the annular portion 60 is provided with an engageable projection portion 62 projecting radially outwardly. The engageable projection portion 62 on the outer circumference 60a of the annular portion 60 engages with an engageable recessed portion 63 provided on an inner circumference 3a of the first housing 3. The engagement between the engageable projection portion 62 and the engageable recessed portion 63 regulates a rotation and an axial movement of the second rack bush 86.

Figure 19C:
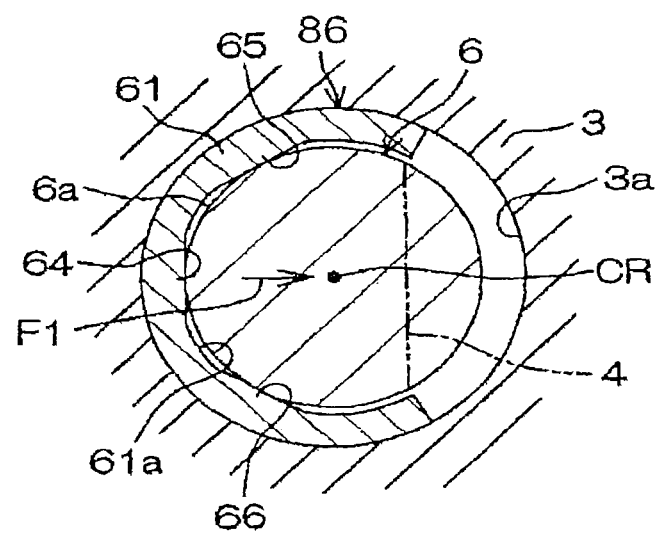
FIG. 19C is a sectional view along a line 19C-19C of FIG. 19A, and illustrates a relationship between a circular-arc-section portion of the second rack bush and the rack shaft.

As illustrated in FIG. 19C, which is a sectional view along a line 19C-19C of FIG. 19A, an inner circumference 61a of the circular-arc-section portion 61 is provided with a plurality of elastic projection portions 64, 65, 66 having a mound-shaped section and formed as protrusions extending axially. Each of the elastic projection portions 64, 65, 66 forms a flat surface projecting from a cylindrical surface that is a reference surface constituting the inner circumference 61a of the circular-arc-section portion 61. The elastic projection portion 64 is placed at a central position between the elastic projection portion 65 and the elastic projection portion 66 in terms of a circumferential direction of the rack shaft 6. For example, the elastic projection portion 64 is separated from both of the elastic projection portions 65, 66 in the circumferential direction of the rack shaft 6 at an angle pitch of 45°.

Figure 20:
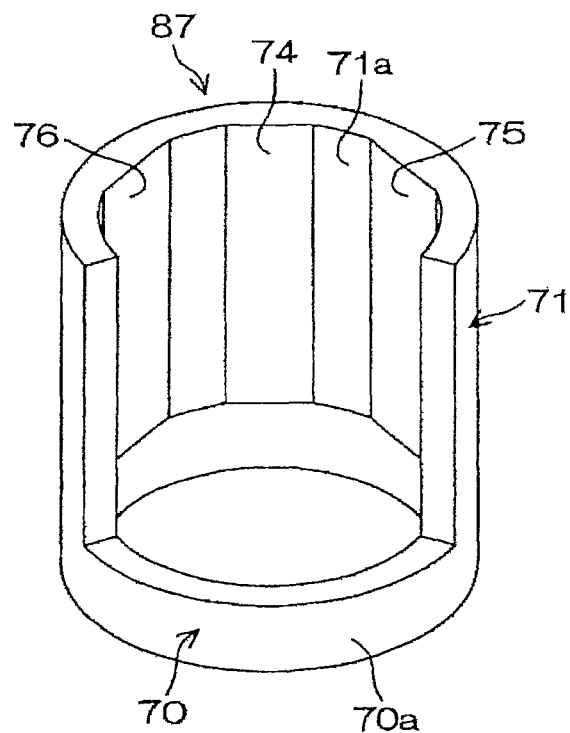
FIG. 20 is a schematic perspective view of a first rack bush.
Figure 21A:
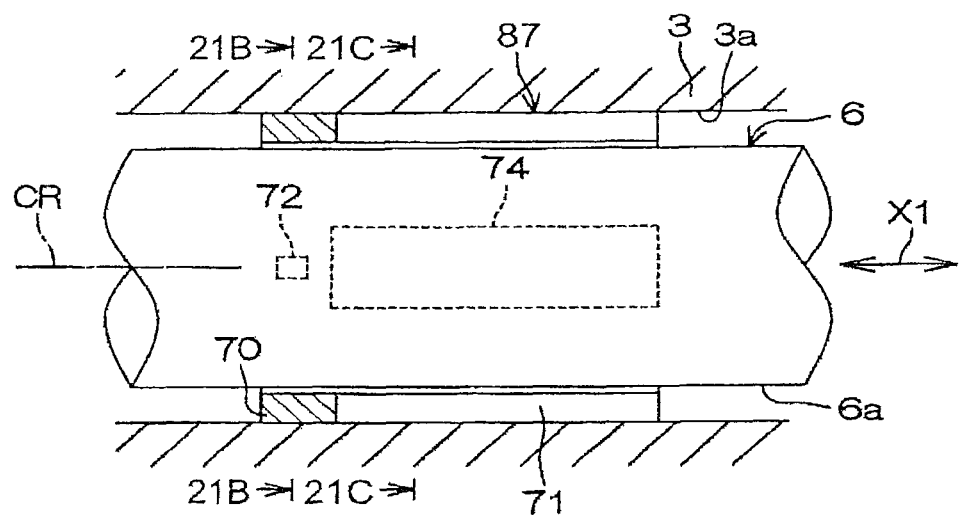
FIG. 21A is a schematic sectional view of a support structure by the first rack bush.

The plurality of elastic projection portions 64 to 66 biases the rack shaft 6 toward the first pinion 7 in cooperation with each other. That is, the second rack bush 86 biases the rack shaft 6 toward the first pinion 7 by a biasing force F1, which is a resultant force of the plurality of elastic projection portions 64 to 66. As illustrated in FIGS. 20 and 21A, a first rack bush 87 is placed at an intermediate portion between the pinion shafts 8, 10 in tennis of the axial direction X1 of the rack shaft 6 so as to support the rack shaft 6 and biases the rack shaft 6 toward the first pinion 7 and the second pinion 9, and the first rack bush 87 includes: an annular portion 70 supported by the first housing 3 and surrounding a whole circumference of the intermediate portion in the axial direction X1 of the rack shaft 6; and a circular-arc-section portion 71 axially extending from the annular portion 70. The first rack bush 87 is formed of resin, for example.

Figure 21B:
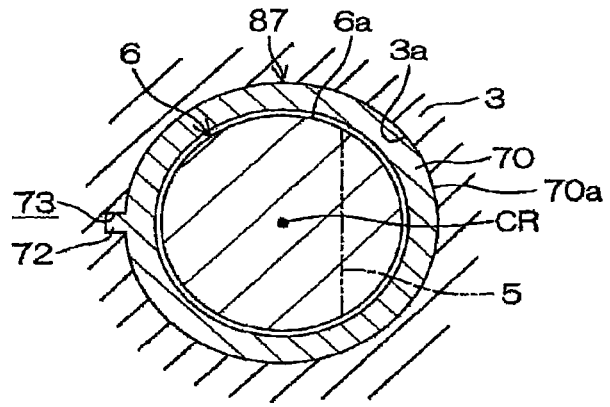
FIG. 21B is a sectional view along a line 21B-21B of FIG. 21A, and illustrates a relationship between an annular portion of the first rack bush and the rack shaft.

As illustrated in FIG. 21B, which is a sectional view along a line 21B-21B of FIG. 21A, an outer circumference 70a of the annular portion 70 is provided with an engageable projection portion 72 projecting radially outwardly. The engageable projection portion 72 on the outer circumference 70a of the annular portion 70 engages with an engageable recessed portion 73 provided on the inner circumference 3a of the first housing 3. The engagement between the engageable projection portion 72 and the engageable recessed portion 73 regulates a rotation and an axial movement of the first rack bush 87.

Figure 21C:
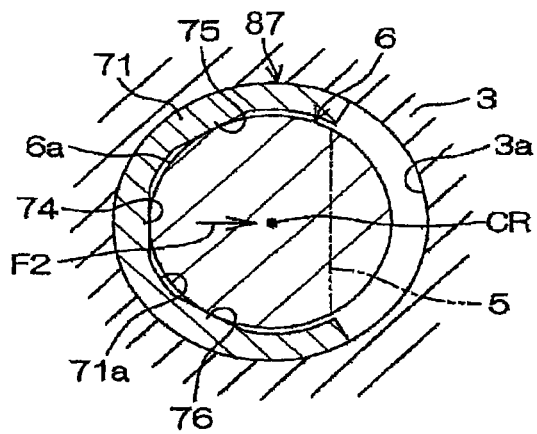
FIG. 21C is a sectional view along a line 21C-21C of FIG. 21A, and illustrates a relationship between a circular-arc-section portion of the first rack bush and the rack shaft.

As illustrated in FIG. 21C, which is a sectional view along a line 21C-21C of FIG. 21A, an inner circumference 71a of the circular-arc-section portion 71 is provided with a plurality of elastic projection portions 74, 75, 76 having a mound-shaped section and formed as protrusions extending axially. Each of the elastic projection portions 74, 75, 76 faults a flat surface projecting from a cylindrical surface that is a reference surface constituting the inner circumference 71a of the circular-arc-section portion 71. The elastic projection portion 74 is placed at a central position between the elastic projection portion 75 and the elastic projection portion 76 in terms of the circumferential direction of the rack shaft 6. For example, the elastic projection portion 74 is separated from both of the elastic projection portions 75, 76 in the circumferential direction of the rack shaft 6 at an angle pitch of 45°.

Figure 22:
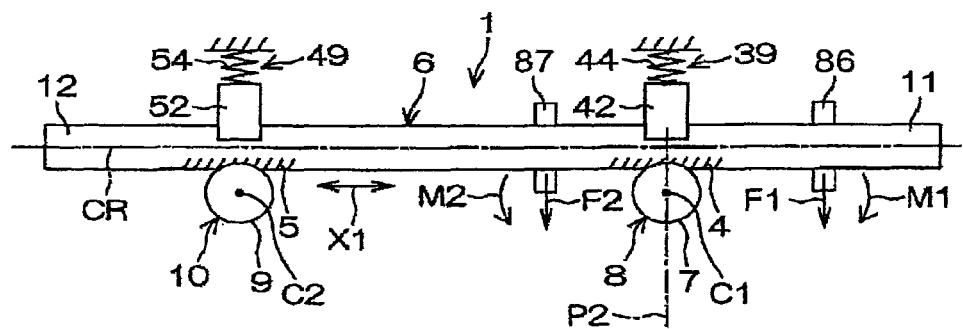
FIG. 22 is a schematic view of a structure for supporting the rack shaft in the steering system of FIG. 1.

The plurality of elastic projection portions 74 to 76 biases the rack shaft 6 toward the first pinion 7 and the second pinion 9 in cooperation with each other. That is, the first rack bush 87 biases the rack shaft 6 toward the first pinion 7 and the second pinion 9 by a biasing force F2, which is a resultant force of the plurality of elastic projection portions 74 to 76. According to the present embodiment, as illustrated in FIG. 22, which is a schematic view, that biasing force F1 by the second rack bush 86 placed at the first end portion 11 of the rack shaft 6 and biasing the rack shaft 6 toward the first pinion 7 generates a moment M1 in a direction where the rack shaft 6 is separated from the second pinion 9, where a position P2 at which the rack shaft 6 is sandwiched between the first pinion 7 and a first rack guide 39 is taken as a supporting point. The first rack bush 87 biases the rack shaft 6 toward both of the pinions 7, 9 against the moment M1 by the second rack bush 86, thereby making it possible to restrain an increase of backlash between the second pinion 9 and the second rack 5.

More specifically, that first rack bush 87 placed between the first pinion shaft 8 and the second pinion shaft 10 in terms of the axial direction X1 of the rack shaft 6 generates a moment M2 resisting the moment M1 caused by the first rack bush 16, where the position P2 at which the rack shaft 6 is sandwiched between the first pinion 7 and the first rack guide 39 is taken as the supporting point. This makes it surely possible to restrain an increase of backlash between the second pinion 9 and the second rack 5.

Further, the first pinion shaft 8 is a shaft for transmission of steering auxiliary force, the second pinion shaft 10 is a shaft for transmission of manual steering effort, and only the second rack bush 86 and the first rack bush 87 are provided as bearings for supporting the rack shaft 6. Thus, the following advantage is obtained. That is, if a rack bush is placed at that second end portion 12 of the rack shaft 6 which is close to the second pinion 9 for transmission of manual steering effort, the rack bush is placed distant from the supporting point (the position P2), and therefore, the rack bush generates a large moment mainly on the supporting point. Against the large moment, the first rack bush will generate a large reaction force moment component. Accordingly, both of the rack bush placed at the second end portion 12 and the first rack bush 16 generate a large frictional resistance to the rack shaft 6, which may impair steering feeling. In contrast, in the present embodiment, since no rack bush is placed at the second end portion 12, it is possible to restrain an increase of the frictional resistance against a movement of the rack shaft 6 and to obtain good steering feeling.

Figure 23:
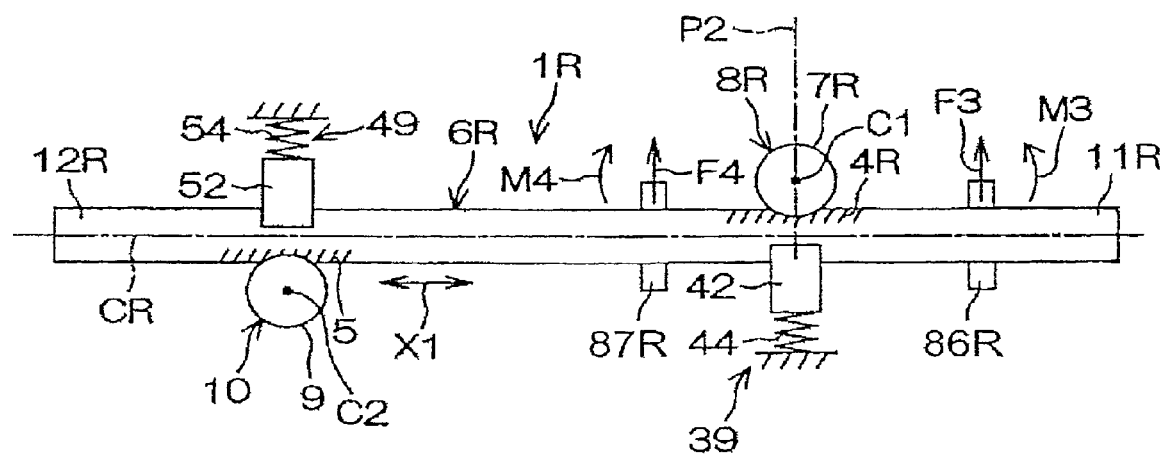
FIG. 23 is a schematic view of a structure for supporting a rack shaft in a steering system according to a reference embodiment of the invention.
Figure 24:
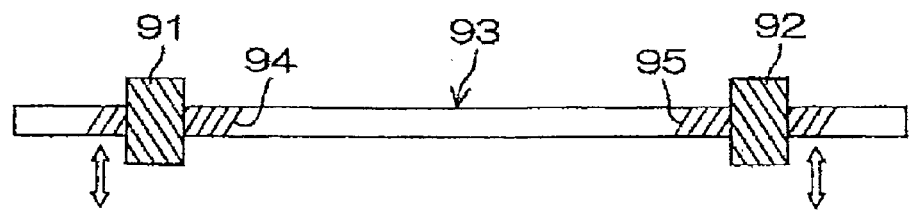
FIG. 24 is a schematic view of a steering system in a related art, and a view to describe a translational motion of a rack shaft.

FIG. 23 schematically illustrates a support structure of a rack shaft 6R of a steering system 1R according to a reference embodiment of the invention. Referring to FIG. 23, the reference embodiment is different from the embodiment of FIG. 22 in the following point. That is, in the embodiment of FIG. 22, the first rack 4 and the second rack 5 are provided on the same side relative to the central axis CR of the rack shaft 6, and the first pinion shaft 8 and the second pinion shaft 10 are placed on the same side relative to the rack shaft 6.

In contrast, in the present embodiment, a first rack 4R and a second rack 5 are provided on opposite sides to each other relative to a central axis CR of the rack shaft 6R, and a first pinion shaft 8R for transmission of steering auxiliary force and a second pinion shaft 10 for transmission of manual steering effort are placed on opposite sides to each other with the rack shaft 6R sandwiched therebetween. A first pinion 7R of the first pinion shaft 8R meshes with the first rack 4R. A second rack bush 86R placed at a first end portion 11R of the rack shaft 6R generates a biasing force F3 to bias the rack shaft 6R toward the first pinion 7R. A first rack bush 87R placed between the pinion shafts 8R, 10 in teens of an axial direction X1 of the rack shaft 6R generates a biasing force F4 to bias the rack shaft 6R toward the first pinion 7R. No rack bush is placed at a second end portion 12R of the rack shaft 6R.

A constituent, in the reference embodiment, which is the same as a constituent in the embodiment of FIG. 22 has the same reference sign as the constituent in the embodiment of FIG. 22. According to this reference embodiment, the biasing force F3 caused by the second rack bush 86R generates a moment M3 in a direction where the rack shaft 6R is pressed against the second pinion 9 where a position P2 at which the rack shaft 6R is sandwiched between the first pinion 7R and a first rack guide 39 is taken as a supporting point.

On the other hand, the biasing force F4 caused by the first rack bush 87R generates a moment M4 in a direction where the rack shaft 6R is separated from the second pinion 9, where the position P2 is taken as a supporting point. However, the first rack bush 87R is placed between the pinion shafts 8R, 10, and is able to be placed close to the position P2 as the supporting point (relatively close thereto in comparison with a case where a rack bush is placed at the second end portion 12R), so that it is possible to make the moment M4 relatively small. This accordingly makes it possible to restrain an increase of backlash between the second pinion 9 and the second rack 5.

The present invention is not limited to the above embodiments and each of the elastic projection portions may be formed so as to have a mound-shaped section. In addition, various modifications can be made within a scope of claims of the invention.

What is claimed is:

1. A steering system comprising:
   a housing;
   a rack shaft extending in an axial direction so as to pass through the housing and including a first rack and a second rack on an outer circumference of the rack shaft so that the first rack and the second rack are separated from each other in the axial direction, the first rack and the second rack having respective helical teeth inclined toward a same direction relative to the axial direction;
   a first pinion shaft including a first pinion that has helical teeth and meshes with the first rack;
   a second pinion shaft including a second pinion that has helical teeth and meshes with the second rack, the first pinion shaft and the second pinion shaft being disposed on a same side of the rack shaft relative to a plane that extends along a central axis of the rack shaft, and a central axis of the second pinion shaft being parallel to a central axis of the first pinion shaft; and
   a rack bush disposed between the first pinion shafts shaft and the second pinion shaft in the axial direction of the rack shaft, the rack bush further being disposed closer to the first pinion shaft than a central position defined between the first pinion shaft and the second pinion shaft in the axial direction of the rack shaft, the rack bush being held by the housing so as to support the rack shaft slidably in the axial direction, and the rack bush being configured to limit a movement of the rack shaft in a direction parallel to both the central axis of the first pinion shafts shaft and the central axis of the second pinion shaft.

2. The steering system according to claim 1, wherein:
the first pinion shaft is a shaft for transmission of steering auxiliary force, and the second pinion shaft is a shaft for transmission of manual steering effort.

3. The steering system according to claim 2, wherein:
the rack shaft includes a first end portion disposed closer to the first pinion shaft than the second pinion shaft, and a second end portion disposed opposite to the first end portion,
the steering system further comprising:
a second rack bush held by the housing so as to be separated from a first rack bush serving as the rack bush, and supporting the first end portion of the rack shaft slidably in the axial direction.

4. The steering system according to claim 1, wherein:
the rack bush includes, as a biasing portion for biasing the rack shaft, elastic projection portions for biasing the rack shaft in the direction parallel to the central axis of the first pinion shaft and the central axis of the second pinion shaft.

5. The steering system according to claim 1, wherein:
the rack bush includes, as a biasing portion for biasing the rack shaft, only elastic projection portions for biasing the rack shaft in the direction parallel to the central axis of the first pinion shaft and the central axis of the second pinion shaft.

6. The steering system according to claim 1, wherein:
the rack bush includes, as a biasing portion for biasing the rack shaft, a first elastic projection portion for biasing the rack shaft in the direction parallel to the central axis of the first pinion shaft and the central axis of the second pinion shaft, and a second elastic projection portion for biasing the rack shaft toward at least one of the first pinion and the second pinion.

7. A steering system comprising:
a housing;
a rack shaft extending in an axial direction so as to pass through the housing and including a first rack and a second rack on an outer circumference of the rack shaft so that the first rack and the second rack are separated from each other in the axial direction, the first rack and the second rack having respective helical teeth inclined toward a same direction relative to the axial direction;
a first pinion shaft including a first pinion that has helical teeth and meshes with the first rack;
a second pinion shaft including a second pinion that has helical teeth and meshes with the second rack, the first pinion shaft and the second pinion shaft being disposed on opposite sides of the rack shaft relative to a plane that extends along a central axis of the rack shaft and parallel to a central axis of the first pinion shaft; and
a rack bush disposed between the first pinion shaft and the second pinion shaft in the axial direction of the rack shaft, the rack bush further being disposed closer to the first pinion shaft that a central position defined between the first pinion shaft and the second pinion shaft in the axial direction of the rack shaft, the rack bush being held by the housing so as to support the rack shaft slidably in the axial direction, and the rack bush being configured to limit a movement of the rack shaft in a direction parallel to the central axis of the first pinion shaft and a central axis of the second pinion shaft.

8. The steering system according to claim 7, wherein:
the first pinion shaft is a shaft for transmission of steering auxiliary force, and the second pinion shaft is a shaft for transmission of manual steering effort.

9. The steering system according to claim 8, wherein:
the rack shaft includes a first end portion disposed closer to the first pinion shaft than the second pinion shaft, and a second end portion disposed opposite to the first end portion,
the steering system further comprising:
a second rack bush held by the housing so as to be separated from a first rack bush serving as the rack bush, and supporting the first end portion of the rack shaft slidably in the axial direction.

10. The steering system according to claim 7, wherein:
the rack bush includes, as a biasing portion for biasing the rack shaft, elastic projection portions for biasing the rack shaft in the direction parallel to the central axis of the first pinion shaft and the central axis of the second pinion shaft.

11. The steering system according to claim 7, wherein:
the rack bush includes, as a biasing portion for biasing the rack shaft, only elastic projection portions for biasing the rack shaft in the direction parallel to the central axis of the first pinion shaft and the central axis of the second pinion shaft.

12. The steering system according to claim 7, wherein:
the rack bush includes, as a biasing portion for biasing the rack shaft, a first elastic projection portion for biasing the rack shaft in the direction parallel to the central axis of the first pinion shaft and the central axis of the second pinion shaft, and a second elastic projection portion for biasing the rack shaft toward at least one of the first pinion and the second pinion.

13. A steering system comprising:
a housing;
a rack shaft passing through the housing and having a first end portion and a second end portion which are opposite to each other in an axial direction, the rack shaft including a first rack disposed proximate the first end portion of the rack shaft, and a second rack disposed proximate the second end portion of the rack shaft, the first rack and the second rack further being disposed on a same side of the rack shaft relative to a central axis of the rack shaft;
a first pinion shaft including a first pinion meshing with the first rack;
a second pinion shaft including a second pinion meshing with the second rack, the first pinion shaft and the second pinion shaft being disposed on a same side of the rack shaft, relative to a plane that extends along the central axis of the rack shaft, and a central axis of the second pinion shaft being parallel to a central axis of the first pinion shaft;
a first rack guide held by the housing and biasing the rack shaft from a back of the first rack toward the first pinion;
a second rack guide held by the housing and biasing the rack shaft from a back of the second rack toward the second pinion;
a first rack bush supported by the housing, supporting the first end portion of the rack shaft slidably in the axial direction, and biasing the rack shaft toward the first pinion and the second pinion; and
a second rack bush supported by the housing, supporting the first end portion of the rack shaft slidably in the axial direction, and biasing the rack shaft toward the first pinion.

14. The steering system according to claim 13, wherein:
the first rack bush is disposed between the first pinion shaft and the second pinion shaft in the axial direction of the rack shaft.

15. The steering system according to claim 13, wherein:
the first pinion shaft is a shaft for transmission of steering auxiliary force, the second pinion shaft is a shaft for transmission of manual steering effort, and only the first rack bush and the second rack bush are provided as bearings for supporting the rack shaft.

\* \* \* \* \*